US012360748B1

(12) United States Patent
Zhang et al.

(10) Patent No.: US 12,360,748 B1
(45) Date of Patent: Jul. 15, 2025

(54) SYSTEMS AND METHODS FOR PERFORMING WORST-CASE EXECUTION TIME ANALYSIS OF SIMULATION MODELS

(71) Applicant: The MathWorks, Inc., Natick, MA (US)

(72) Inventors: Yuchen Zhang, Dover, MA (US); Partha Biswas, Wayland, MA (US); Xiaocang Lin, Sherborn, MA (US); Dixin Zhou, Ashland, MA (US); Mario Bambagini, Histon (GB); William F. Potter, Waddell, AZ (US); Chirag Gupta, Bangalore (IN)

(73) Assignee: The MathWorks, Inc., Natick, MA (US)

( * ) Notice: Subject to any disclaimer, the term of this patent is extended or adjusted under 35 U.S.C. 154(b) by 135 days.

(21) Appl. No.: 18/075,855

(22) Filed: Dec. 6, 2022

Related U.S. Application Data

(60) Provisional application No. 63/413,845, filed on Oct. 6, 2022.

(51) Int. Cl.
   *G06F 8/35* (2018.01)
(52) U.S. Cl.
   CPC ..................... *G06F 8/35* (2013.01)
(58) Field of Classification Search
   CPC ........................................................ G06F 8/35
   See application file for complete search history.

(56) References Cited

U.S. PATENT DOCUMENTS

| 5,961,599 | A  | * | 10/1999 | Kalavade | G06F 11/3452 |
| | | | | | 709/224 |
| 7,007,270 | B2 | * | 2/2006 | Martin | G06F 11/3447 |
| | | | | | 714/E11.197 |
| 7,702,499 | B1 | * | 4/2010 | Lavagno | G06F 11/3457 |
| | | | | | 703/27 |
| 8,104,017 | B2 | | 1/2012 | Lin et al. | |
| 8,316,368 | B2 | * | 11/2012 | Vestal | G06F 9/4881 |
| | | | | | 718/105 |

(Continued)

OTHER PUBLICATIONS

Allabriga, Clément, and Hugues Casse. "Improving the WCET computation time by IPET using control flow graph partitioning." 8th International Workshop on Worst-Case Execution Time WCET Analysis (WCET'08). Schloss Dagstuhl-Leibniz-Zentrum für Informatik, 2008. (Year: 2008).*

(Continued)

*Primary Examiner* — Matthew J Brophy
(74) *Attorney, Agent, or Firm* — Cesari and McKenna, LLP; Michael R. Reinemann

(57) ABSTRACT

Systems and methods determine tight Worst Case Execution Time (WCET) for a simulation model or code generated for a model. Composite code blocks may be constructed from basic code blocks of an in-memory representation of the model. Information on the model and its elements may be obtained and utilized to construct the composite code blocks. The composite code blocks may be instrumented and execution times may be measured for the composite code blocks. The execution times for the composite code blocks along paths through the model may be summed and the highest total execution time may be presented as the WCET for the model and/or the code generated for the model.

15 Claims, 24 Drawing Sheets

(56) References Cited

U.S. PATENT DOCUMENTS

| | | | |
|---|---|---|---|
| 8,402,449 B1* | 3/2013 | Biswas | G06F 30/392 717/146 |
| 8,762,953 B2 | 6/2014 | French et al. | |
| 8,990,783 B1 | 3/2015 | Yu et al. | |
| 9,311,057 B2 | 4/2016 | Brunel et al. | |
| 9,471,383 B2* | 10/2016 | Paul | G06F 9/505 |
| 9,582,768 B1 | 2/2017 | Englehart et al. | |
| 10,108,400 B1* | 10/2018 | Myren | G06F 13/4221 |
| 10,409,563 B2* | 9/2019 | Portes | G06F 9/30145 |
| 10,466,671 B2* | 11/2019 | Stattelmann | G05B 19/058 |
| 11,726,831 B2* | 8/2023 | Ikegami | G06F 9/5066 718/104 |
| 11,748,530 B2* | 9/2023 | Cucu-Grosjean | G06F 30/20 703/2 |
| 2008/0022288 A1* | 1/2008 | Bekooij | G06F 9/4887 718/107 |
| 2010/0199280 A1* | 8/2010 | Vestal | G06F 9/52 713/320 |
| 2010/0325635 A1* | 12/2010 | Pree | G06F 9/4887 718/103 |
| 2011/0010160 A1* | 1/2011 | Pree | G06F 8/10 718/100 |
| 2012/0310620 A1* | 12/2012 | Resmerita | G06F 9/4843 703/17 |
| 2015/0286203 A1* | 10/2015 | Stattelmann | G05B 11/01 700/109 |
| 2016/0011908 A1* | 1/2016 | Paul | G06F 9/505 718/104 |
| 2016/0247081 A1* | 8/2016 | Zaykov | G06N 7/01 |
| 2018/0157571 A1* | 6/2018 | Lünstroth | G06F 11/3457 |
| 2020/0159974 A1* | 5/2020 | Cucu-Grosjean | G06F 11/3419 |
| 2022/0171660 A1* | 6/2022 | Ikegami | G06F 9/4881 |

OTHER PUBLICATIONS

Asavoae, Mihail, et al., "Program Semantics in Model-Based WCET Analysis: A State of the Art Perspective," Claire Maiza, editor, 13th International Workshop on Worst-Case Execution Time Analysis, WCET 2013, Jul. 9, 2013, Paris, France, Oasics 30, Schloss Dagstuhl—Leibniz-Zentrum für Informatik, Dagstuhl Publishing, Germany, Jul. 9, 2013, pp. 1-10.

"Automating WCET Analysis for DO-178B/C," Rapita Systems Inc., Rapita Systems, White Paper, Jan. 2018, pp. 1-14.

Barkah, Dani, et al., "Evaluation of Automatic Flow Analysis for WCET Calculation on Industrial Real-time System Code," IEEE, Proceedings—2008 Euromicro Conference on Real-Time systems, Prague, Czech Republic, Jul. 2-4, 2008, pp. 1-10.

Falk, Heiko, et al., "A Compiler Framework for the Reduction of Worst-Case Execution Times," Springer Link, Springer, Real-Time Systems, vol. 46, Issue 2, Jul. 22, 2010, pp. 251-298.

Gliwa, Peter, "Why We Need a New Worst Case Timing Approach for Automotive," T1, EMCC2022, Oct. 11, 2022, pp. 1-27.

Hansen, Jeffery, et al., "Statistical-Based WCET Estimation and Validation," ECRTS 2009, $9^{th}$ International Workshop on Worst-Case Execution Time (WCET) Analysis, Dublin, Ireland, Jul. 1-3, 2009, pp. 1-11.

Heckmann, Reinhold, et al., "Worst-Case Execution Time Prediction by Static Program Analysis," AbsInt Angewandte Informatik GmBH, AbsInt, Apr. 2004, pp. 1-12.

Johnson, Richard, et al., "The Program Structure Tree: Computing Control Regions in Linear Time," ACM Sigplan, in Notices, Proceedings of the ACM Sigplan 1994 conference on Programming language design and implementation (PLDI '94). Association for Computing Machinery, New York, NY, USA, Notices, vol. 29, Issue 6, Jun. 1, 1994, pp. 171-185.

Kirner, Raimund, et al., "Fully Automatic Worst-Case Execution Time Analysis for Matlab/Simulink Models," IEEE, Proceedings 14th Euromicro Conference on Real-Time Systems. Euromicro RTS 2002, Vienna, Austria, Jun. 19-21, 2002, pp. 1-10.

Lokuciejewski, Paul, "Superblock-Based Source Code Optimizations for WCET Reduction," Jun. 2010, pp. 1-8.

"Measuring WCET from Matlab® Simulink® Models with RapiTime," Rapita Systems Ltd., Rapita Systems, Document ID: MC-TN-006 Matlab WCET with RapiTime v5, INDT-v8, date first accessed May 11, 2023, pp. 1-2.

Merriam, Dr. Nicholas, "A New Worst-Case Timing Approach for Automotive: Worst is Not Always Best," T1, ESE, ESE (Embedded Software Engineering Congress) 2022 in Sindelfingen, Dec. 5-9, 2022, pp. 1-34.

"Program Execution Time", Elsevier B.V., Elsevier, ScienceDirect, 2014, pp. 1-46.

"Simulink User's Guide," Matlab®&Simulink®, The MathWorks, Inc., R2022a, Mar. 2022, pp. 1-4122.

Wilhelm, Reinhard, et al., "The Worst-Case Execution-Time Problem-Overview of Models and Survey of Tools," ACM, ACM Transactions on Embedded Computing Systems, vol. 7, No. 3, Article 36, Apr. 2008, pp. 1-53.

Lokuciejewski, P., "A WCET-Aware Compiler: Design, Concepts and Realization," Av Akademikerverlag, May 2012, pp. I-VII, 1-21, and 96-107.

"Measuring WCET from Matlab Simulink® Models with RapiTime," Rapita Systems Ltd., Rapita Systems, Document ID: MC-TN-006 Matlab WCET with RapiTime v5, INDT-v8, Feb. 2022, pp. 1-2.

"Embedded Coder® User's Guide", Matlab® & Simulink®, R2022a, The MathWorks, Inc., Mar. 2022, pp. 1-3942.

* cited by examiner

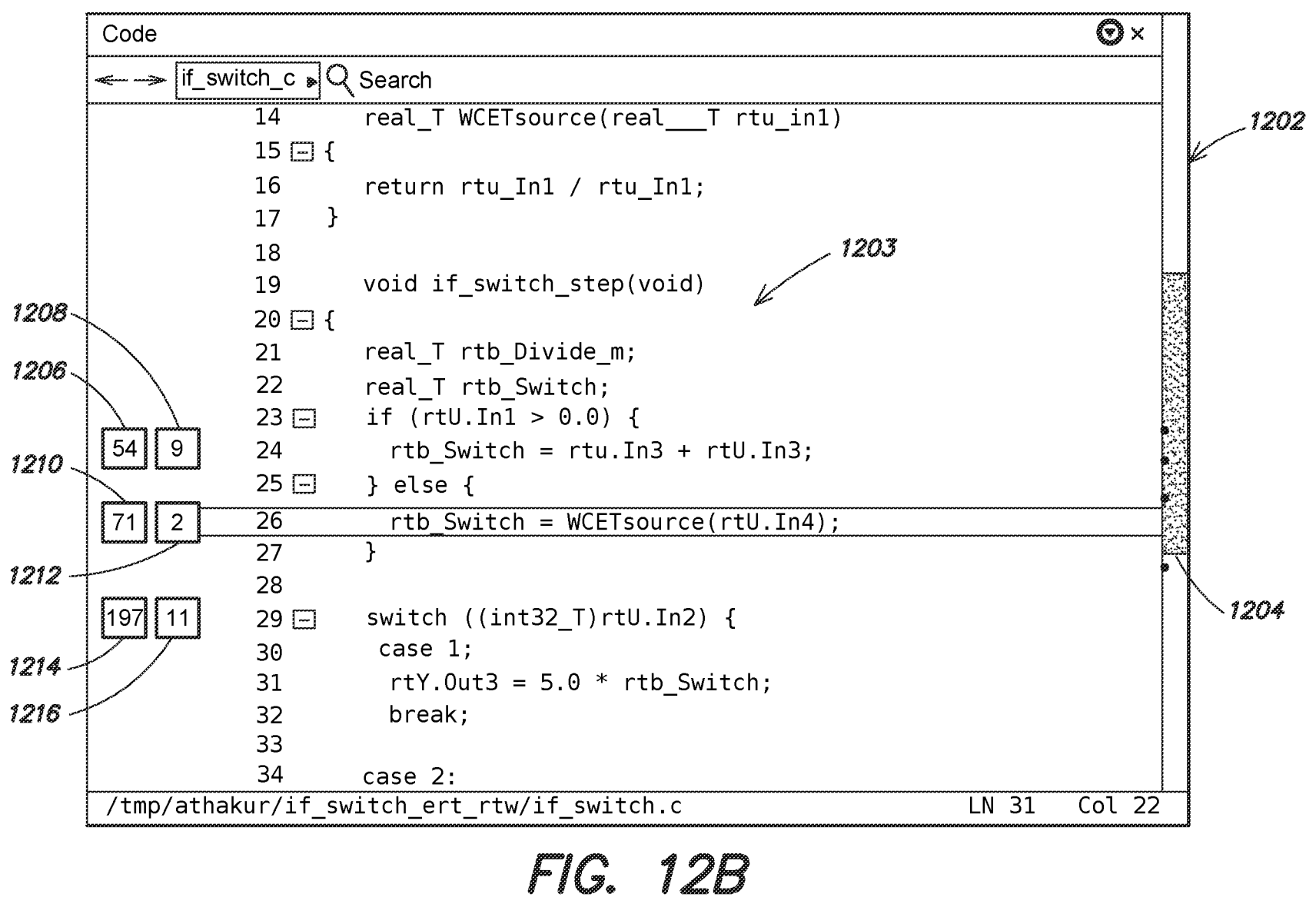

```
Code
┌─────────────────────────────────────────────┐
│ if_switch_c  ⚲ Search                    ▶ ✕│
├─────────────────────────────────────────────┤
│ 14   real_T WCETsource(real__T rtu_in1)     │
│ 15 ⊟ {                                      │
│ 16     return rtu_In1 / rtu_In1;            │
│ 17   }                                      │
│ 18                                          │
│ 19   void if_switch_step(void)              │
│ 20 ⊟ {                                      │
│ 21     real_T rtb_Divide_m;                 │
│ 22     real_T rtb_Switch;                   │
│ 23 ⊟   if (rtU.In1 > 0.0) {                 │
│ 24       rtb_Switch = rtu.In3 + rtU.In3;    │
│ 25 ⊟   } else {                             │
│ 26       rtb_Switch = WCETsource(rtU.In4);  │
│ 27     }                                    │
│ 28                                          │
│ 29 ⊟   switch (((int32_T)rtU.In2) {         │
│ 30      case 1;                             │
│ 31        rtY.Out3 = 5.0 * rtb_Switch;      │
│ 32        break;                            │
│ 33                                          │
│ 34      case 2:                             │
├─────────────────────────────────────────────┤
│ /tmp/athakur/if_switch_ert_rtw/if_switch.c   LN 31  Col 22 │
└─────────────────────────────────────────────┘
```

FIG. 12B

```
Code
← → AHRS_voter_cov.c ▼   ◯ Search

Model elements
 [M] <S4>Switch1   [M] <Root>/Single_Value   [M] <Root>/MultiportSwitch 91    if (rtu_AHRS2->valid) {
 92        AHRS_voter_cov_MdlrefDW.rtb.Switch1_ozfq[0] = rtu_AHRS2->theta;
 93        AHRS_voter_cov_MdlrefDW.rtb.Switch1_ozfq[1] = rtu_AHRS2->phi1;
 94        AHRS_voter_cov_MdlrefDW.rtb.Switch1_ozfq[2] = rtu_AHRS2->r;
 95        AHRS_voter_cov_MdlrefDW.rtb.Switch1_ozfq[3] = rtu_AHRS2->q;
 96        AHRS_voter_cov_MdlrefDW.rtb.Switch1_ozfq[4] = rtu_AHRS2->p;
 97    } else {
 98        for (i_3 = 0; i_3 < 5; i_3 = i_3 + 1) {
 99            AHRS_voter_cov_MdlrefDW.rtb.Switch1_ozfq(i_3) =
100                AHRS_voter_cov_ConstP.pooled1[(i_3)];
101        }
102    }
103
104    /* End of Switch: '<S4>/Switch1' */
105
106    /* Switch: '<S4>'Switch2' incorporates:
107     *  Constant: '<S4>/Constant'
108     */
```

FIG. 13A

```
109  ┌─┐ if (rtu_AHRS3->valid) {
110         AHRS_voter_cov_MdlrefDW.rtb.Switch2_kwmv[0] = rtu_AHRS3->theta;
111         AHRS_voter_cov_MdlrefDW.rtb.Switch2_kwmv[1] = rtu_AHRS3->ph1;
112         AHRS_voter_cov_MdlrefDW.rtb.Switch2_kwmv[2] = rtu_AHRS3->r;
113         AHRS_voter_cov_MdlrefDW.rtb.Switch2_kwmv[3] = rtu_AHRS3->q;
114         AHRS_voter_cov_MdlrefDW.rtb.Switch2_kwmv[4] = rtu_AHRS3->p;
115  ┌─┐ } else {
116  ┌─┐    for (i_5 = 0; i_5 < 5; i_5 = i_5 + 1) {
117           AHRS_voter_cov_MdlrefDW.rtb.Switch2_kwmv(i_5) =
118             AHRS_voter_cov_ConstP.pooled1[(i_5)];
119        }
120     }
121
122     /* End of Switch: '<S4>/Switch2' */
123     /* End of Outputs for Subsystem: '<Root>/Single_Value' */
124  ┌─┐ for (i_7 = 0; i_7 < 5; i_7 = i_7 + 1) {
125       /* Outputs for Atomic Subsystem: '<Root>/Single_Value' */
126       rty_voted_fb[i_7] = (rty_voted_fb[i_7] +
127         AHRS_voter_cov_MdlrefDW.rtb.Switch1_ozfq[i_7]) +
128         AHRS_voter_cov_MdlrefDW.rtb.Switch2_kwmv[i_7];
129
130       /* End of Outputs for Subsystem: '<Root>/Single_Value' */
131     }
132     break;
133
```

FIG. 13B

| Section | Maximum Execution Time in Ticks | Average Execution Time in Ticks | Maximum Self Time in Ticks | Average Self Time in Ticks | Calls | | | | |
|---|---|---|---|---|---|---|---|---|---|
| rtw_fuelsys_cov_changed_initialize | 508 | 508 | 508 | 508 | 1 | | | | |
| [-] rtw_fuelsys_cov_changed_output [0.001 0] | 122392 | 6159 | 3726 | 1208 | 1001 | ◐ | | | |
| location_1 | 64702 | 1402 | 64702 | 1402 | 1001 | | | | |
| location_2 | 396 | 93 | 396 | 93 | 1001 | | | | |
| [-] location_4 | 31308 | 1387 | 31308 | 381 | 1001 | ● | | | |
| location_5 | 308 | 95 | 308 | 95 | 101 | | | | |
| location_7 | 288 | 95 | 288 | 95 | 101 | | | | |
| location_9 | 268 | 90 | 268 | 90 | 101 | | | | |
| location_11 | 276 | 95 | 276 | 95 | 101 | | | | |
| location_13 | 482 | 95 | 482 | 95 | 101 | | | | |
| location_14 | 1496 | 306 | 1394 | 196 | 101 | ● | | | |
| [+] location_16 | 108 | 108 | 108 | 108 | 1 | | | | |
| location_79 | 312 | 106 | 312 | 106 | 101 | | | | |
| location_81 | 368 | 88 | 368 | 88 | 101 | | | | |

*FIG. 14*

SYSTEMS AND METHODS FOR PERFORMING WORST-CASE EXECUTION TIME ANALYSIS OF SIMULATION MODELS

CROSS-REFERENCE TO RELATED APPLICATIONS

This application claims the benefit of U.S. Provisional Patent Application Ser. No. 63/413,845 filed Oct. 6, 2022 for Systems and Methods for Performing Worst-Case Execution Time Analysis of Simulation Models, which application is hereby incorporated by reference in its entirety.

BRIEF DESCRIPTION OF THE DRAWINGS

The description below refers to the accompanying drawings, of which:

FIGS. 12A-B are partial views of an example of another UI for presenting WCET analysis results in accordance with one or more embodiments;

FIGS. 13A-B are partial views of an illustration of a code window in accordance with one or more embodiments;

FIG. 14 is an illustration of an example profiling details window in accordance with one or more embodiments

DETAILED DESCRIPTION OF ILLUSTRATIVE EMBODIMENTS

Figure 1:
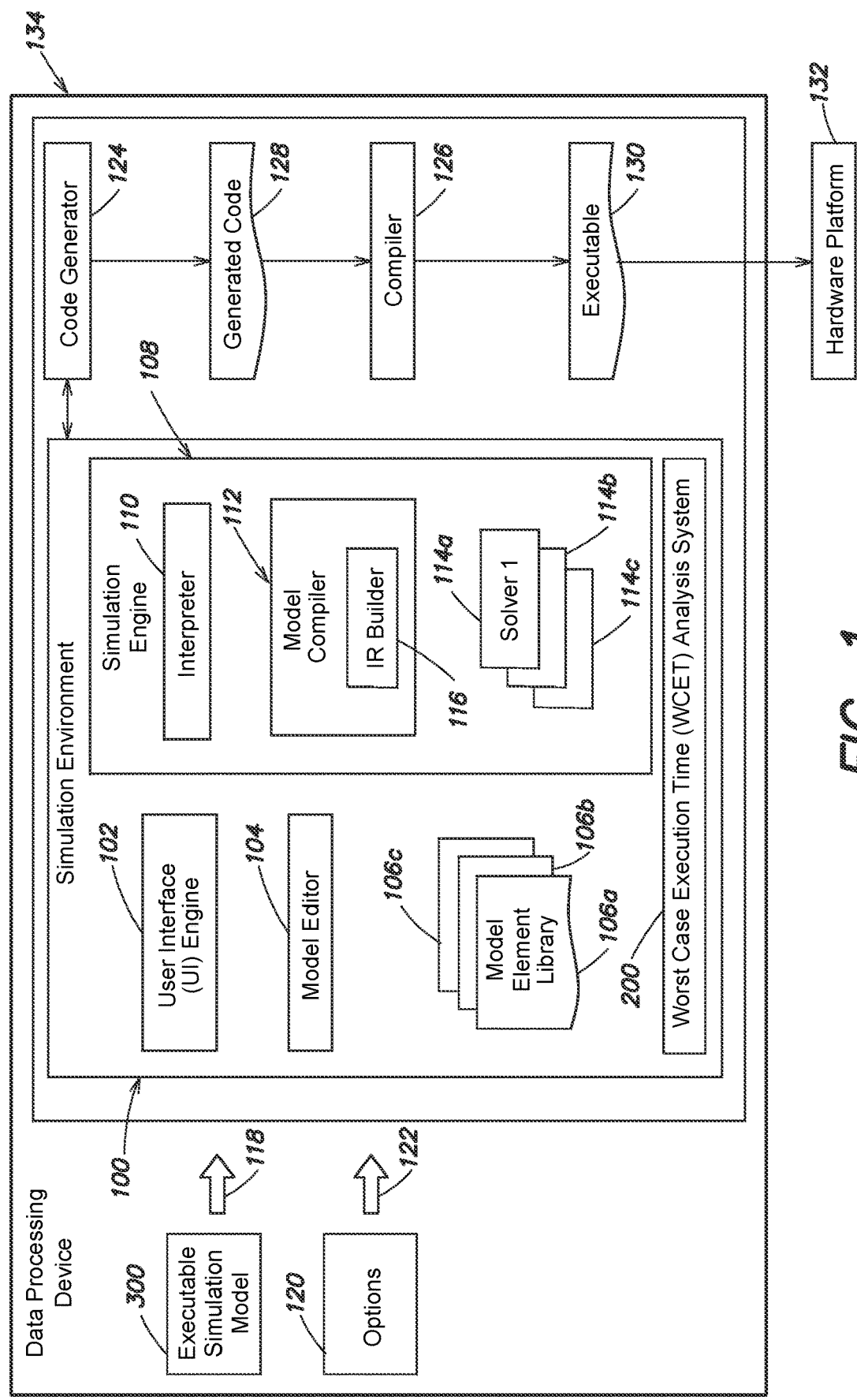
FIG. 1 is a partial functional diagram of an example simulation environment in accordance with one or more embodiments.

Computer-based simulation environments are often used to design systems, such as control systems, communications systems, factory automation systems, etc. A user may construct a simulation model of a system being developed within the simulation environment. A graphical simulation model, for example, may include a plurality of model elements such as blocks, icons, objects, etc., that have predetermined and/or custom defined functionality. Relationships may be established among model elements, and these relationships may appear visually in the graphical model, for example, as arrows, wires, etc. The simulation environment may define a syntax and semantics for graphical simulation models, and may execute a given model according to the syntax and semantics. For example, the simulation environment may generate instructions based on the graphically defined simulation model, and the instructions may be executed.

A user may direct the simulation environment to execute, e.g., run, the simulation model using sample input data, and the model may simulate the operation of the system under design. The user may evaluate whether the simulation model operates in the intended manner. For example, the user may determine whether the model, when executed, generates expected output values. If the model fails to generate output values as expected or to meet other design requirements, the user may revise the model. When the user is satisfied that the model accurately models the behavior or operation of the system being designed and/or meets the design requirements, a code generator may generate code, such as source code, for the model. The generated code may have the same behavior as the simulation model and may thus implement the simulation model. The generated code may be run outside of the simulation environment. For example, it may be compiled and deployed to a target hardware platform, such as an embedded system.

In some embodiments, a simulation model may be created for a system involved in a safety critical application, such as an anti-lock braking system (ABS) for a vehicle, a control system of an autonomous vehicle, a flight control system for an aircraft, etc. Such safety critical systems often need to execute within bounded time constraints. For example, safety critical systems may need to execute in real time or adhere to other run-time guarantees. Failure of the code to meet the run-time guarantees can have serious consequences. A simulation model and/or code generated for a simulation model may be evaluated to determine the range of possible execution times for the model and/or the code. The maximum length of time it takes to execute a simulation model and/or generated code on a specific hardware platform is known as the Worst Case Execution Time (WCET).

Many WCET solutions require a user to manually annotate the program. This can be time-consuming and error-prone. Automated approaches also exist for calculating the WCET. The automated approaches typically apply one of three techniques: (1) measuring execution time during the code's execution of one or more test cases; (2) conducting static analysis of the code's structure; or (3) a hybrid analysis which combines measuring execution time and conducting static analysis. The existing methods for calculating the WCET typically involve approximations, usually a rounding upwards when there are uncertainties. These estimates are typically pessimistic. That is, the estimated WCET is understood to be higher than the real WCET experienced when running the program. Determining an accurate or exact WCET is often considered not possible. Timing estimates that are greater than the true WCET are considered safe. To be useful to system designers, however, a timing estimate should be "tight", i.e., provide little or no overestimation from the program's true WCET. Having a tight WCET can result in improved system design, and may also result in improved performance of code generated for a simulation model.

To calculate the WCET, all of the execution paths through a simulation model should be evaluated. In many cases, especially with complex system designs, a model may have hundreds or more execution paths. Input test cases may be used to test the execution paths of a model. The input test cases may be created to conduct coverage testing according to one or more coverage metrics, such the Modified Condition/Decision Coverage (MCDC) metric. However, MCDC test cases can still sometimes miss one or more execution paths through a model, and the missed path may represent the WCET.

For certain tasks in a real-time system, a WCET path may overshoot the execution time of a large proportion of the execution paths of the task. This may occur when one execution path requires an abnormally large amount of time relative to the other paths. In such a situation, an accurately identified WCET path could help engineering effort focus on the most impactful path of the system and reduce unnecessary waste of resources on most executions of the task. For example, suppose a system has a hundred execution paths, and one of the paths may take ten seconds to execute, while the other ninety-nine paths may take one second to execute. By focusing efforts to modify the one path that takes ten seconds to execute, system engineering could effectively implement the system on less expensive hardware and operate at a faster sample rate. Furthermore, suppose the real-time bound for the system is one second. In order to accommodate the ten second path, the hardware would need to execute at 10× rate. If the ten second path is optimized, less expensive hardware could be used.

Therefore a need exists for a system that can calculate a tight WCET for a simulation model and/or for code generated for a simulation model, for example to ensure safety critical systems meet run-time guarantees.

Briefly, the present disclosure relates to systems and methods for determining a tight worst case execution time (WCET) for executable simulation models and for code generated for executable simulation models.

The systems and methods may generate an in-memory intermediate representation (IR) of the executable simulation model. The IR may be in the form of a graph, and each node of the graph may be or may represent a basic code block. A basic code block may represent a linear sequence of instructions that is entered only at the first instruction, can only be exited from the last instruction, and contains no branches except possibly at the last instruction. The edges of the graph may represent control or data dependencies among the basic code blocks. In some embodiments, the systems and methods may construct a Program Structure Tree (PST) from the graph. Nodes of the PST represent single entry single exit (SESE) fragments or regions, and edges of the PST represent nesting regions. Each SESE fragment or region for example may be a basic code block, a case construct, a loop, a directed acyclic graph (DAG), or a cyclic unstructured region. The systems and methods may traverse the graph or the PST and combine basic code blocks into composite code blocks. Like a basic code block, a composite code block is a linear sequence of instructions that is entered only at the first instruction, can only be exited from the last instruction, and contains no branches except possibly at the last instruction.

The systems and methods may access information from the executable simulation model, such as semantic information entered by a user and/or generated by an execution engine, and utilize that semantic information to determine whether two basic code blocks can be combined into a composite code block or whether a basic code block can be combined with an existing composite code block to form a larger composite code block. The process of combining basic code blocks of the graph or PST into composite code blocks may be repeated until the systems and methods create the largest composite code blocks possible.

The systems and methods may generate code, e.g., source code, based on the graph or PST with the composite code blocks, and may compile the generated source code into object code, e.g., an executable. The systems and methods may instrument the executable at points that correspond to the boundaries of the composite code blocks and any remaining basic code blocks that could not be included in a composite code block. The systems and methods may conduct dynamic analysis by deploying and executing the executable on target hardware, such as through Hardware in the Loop (HIL) or Processor in the Loop (PIL) testing. The systems and methods may execute the executable on the target hardware using input test cases created to conduct coverage testing of the simulation model for one or more coverage metrics, such the Modified Condition/Decision Coverage (MCDC) metric. The systems and methods may collect multiple observed execution times for the composite code blocks and any remaining basic code blocks during the HIL or PIL testing. For each composite code block and remaining basic code block, the systems and methods determine the composite code block's or basic code block's worst case execution time (WCET) from the observed execution times for the composite code block or basic code block. In some embodiments, the systems and methods may not investigate execution times of elements, such as some basic code blocks, within the composite code blocks. Accordingly, execution times can be determined in a more efficient manner as compared to evaluating the execution time of each basic code block. The systems and methods may also determine other metrics and statistics, such as the best execution time and average execution time of the composite code blocks or basic code blocks.

In some embodiments, the systems and methods also may identify composite code blocks and basic code blocks having poor timing predictability or input data sensitivity. The systems and methods may issue one or more notifications or warnings to the user that may identify the corresponding simulation model elements found to have poor timing predictability or input data sensitivity. The user may then choose to modify the simulation model, for example by replacing or modifying the identified model elements and/or changing model element connectivity to resolve or at least improve on the poor timing predictability or input data sensitivity.

The systems and methods may also conduct static path analysis to identify all possible execution paths through the simulation model or code. The path analysis may be performed on the graph or the PST. In some embodiments, the systems and methods may utilize information from the composite code blocks when performing path analysis, such as value range. The systems and methods may preliminarily identify any infeasible paths through the simulation model and/or code, and remove them from the analysis. An infeasible path is a path that is possible to take according to a program's control flow, but is not feasible when executing the program, e.g., based on a value range. In some embodiments, the systems and methods may use symbolic execution to identify infeasible paths. By applying static path analysis, the systems and methods are not limited to the paths identified during the coverage analysis of the simulation model, e.g., the MCDC metric testing. Instead, the systems and methods identify all possible paths through the model and code, then eliminate the infeasible paths. The systems and methods may ensure all paths (except infeasible paths) are evaluated for WCET.

The systems and methods may also construct loop bounds, if possible, for loops included in the simulation model or generated code. For example, the systems and methods may identify unbounded loops in the generated code. The systems and methods may associate, e.g., trace, the unbounded loops identified in the generated code back to the simulation model. The systems and methods may issue one or more notifications or warnings to the user that may identify the elements of the simulation model associated with, e.g., traced from, the identified unbounded loops. In response, the user may either specify a known bound for the loop identified or modify the simulation model to make the loop bounds more explicitly modeled, such as converting a While loop into a more structured For loop, if possible.

The systems and methods may derive an end-to-end WCET for the simulation model and the code, e.g., the WCET for the entire simulation model and/or code, by combining the static path analysis with the WCETs observed for the composite code blocks and any remaining basic code blocks. The systems and methods may indicate, e.g., highlight, the path having the WCET in both the simulation model and/or in the generated code. The user may examine the WCET path in the simulation model, and, in some cases, make changes to one or more model elements along the path to reduce the WCET calculated for the model. The described process of determining the WCET may then be repeated for the simulation model and/or code as modified to determine whether the changes reduced the end-to-end WCET.

In some embodiments, the systems and methods may support validation of the simulation model and/or generated code, such as validation of the WCET path through the simulation model or code. For example, in some cases, the coverage testing, such as the MCDC metric testing, may not test the WCET path. In this case, the systems and methods may support the addition of one or more test generation blocks to the model along the WCET path. For example, a user may add a test objective block with a custom-defined objective that a signal of the model must satisfy in test cases, a test condition block that constrains signal values in test cases, and/or a proof objective block with a custom-defined objective that a signal of the model must satisfy when proving model properties. In other embodiments, instead of relying on test generation, the systems and methods may support the manual addition of one or more tests to a test suite where the one or more tests test the WCET path.

The systems and methods may also provide a User Interface (UI) presenting information from the WCET analysis and/or subsequent validation testing, such as measurement statistics. Exemplary measurement statistics may include standard deviation for the observed execution times. The systems and methods may determine and present execution times for each function included in the generated code, such as initialize functions, step functions, reset functions, and terminate functions, among others. The execution times presented in the UI may include both user time, which represents running the user's software, and system time, which represents running the user's software plus performing any system calls. The execution times may include worst execution times, average execution times, and best execution times. The systems and methods may also present plots of the distribution of observed execution times for the composite code blocks and any remaining basic code blocks.

As described, in some embodiments, instrumented code may be deployed and executed on target hardware in a Processor-in-the-Loop (PIL) testing environment to obtain observed execution times for determining the WCET. In other embodiments, instrumented code may be executed on the workstation running the simulation environment as a Software-in-the-Loop (SIL) testing environment. Observed execution times from the SIL testing may be obtained and used by the systems and methods for determining a WCET. In the case of SIL testing, the WCET may be referred as a 'soft' WCET for the code.

In some embodiments, the systems and methods may access additional information to complement the WCET to calculate an overall system timing or cost profile. For example, an accurate measurement of a task's average case execution time (ACET) and best-case execution time (BCET) may be used to assist in profiling the system runtime resource consumption. With such profile information, the systems and methods may achieve "optimal" system timing or system efficiency through a number of techniques, such as WCET-aware code optimizations, WCET-aware system compute partitioning, and so on. The optimal profile and efficiency may be determined either heuristically or algorithmically when possible. Exemplary heuristics and algorithms are described in P. Lokuciejewski A WCET-Aware Compiler: Design, Concepts and Realization (May 2012) and H. Falk et al. A Compiler Framework for the Reduction of Worst-Case Execution Times (Jul. 2010). An example heuristic is loop unrolling to reduce loop overhead, e.g., at the expense of code size increase, which could in turn add back to the reduced execution time through cache effect. A cost model based on WCET may be used to determine the optimal unrolling threshold. An example algorithm is variable reuse optimization, which may leverage the coloring of an interference graph. The live range of a variable may refer to the distance between the definition of the variable and the uses of the variable. When the live range overlap among variables is represented as interference edges in a graph, the reuse problem reduces to assigning each graph node to an identifier (id) while ensuring that two nodes connected by an edge are assigned different ids. This is equivalent to the classic graph coloring problem, if each id is treated as a color. Given WCET path information, the coloring algorithm can favor the WCET path.

FIG. 1 is a partial functional diagram of an example simulation environment 100 in accordance with one or more embodiments. The simulation environment 100 may include a user interface (UI) engine 102, a model editor 104, one or more model element libraries 106a-c, and a simulation engine 108. The simulation engine 108 may include an interpreter 110, a model compiler 112, and one or more solvers 114a-c. The model compiler 112 may include an Intermediate Representation (IR) builder 116. In accordance with the present disclosure, the simulation environment 100 also may include a worst case execution time (WCET) analysis system 200.

The model element libraries 106a-c may include predefined model element types, and the model editor 104 may create an executable simulation model 300, e.g., by including and arranging instances of selected model element types in the model 300, for example, in response to user interaction with the simulation environment 100. In some embodiments, the simulation model 300 may be an executable graphical model, such as a block diagram model. The simulation engine 108 may execute, e.g., run, the simulation model 300. The simulation environment 100 also may access the executable simulation model 300 to conduct worst-case execution time (WCET) analysis, as indicated by arrow 118. The simulation environment 100 may also receive one or more options 120, as indicated by arrow 122.

The simulation environment 100 may include or have access to other modules or tools, such as a code generator 124 and a compiler 126. The code generator 124 may generate code, such as code 128, based on the executable simulation model 300. For example, the generated code 128 may have the same or equivalent functionality and/or behavior as the executable simulation model 300. The generated code 128 may be source code and may be in a form suitable for execution outside of the simulation environment 100, and may be referred to as standalone code. The compiler 126 may compile the generated code 128 to produce an executable 130, e.g., object code, which may be deployed and run on a hardware platform 132, e.g., for Hardware-in-the-Loop (HIL) or Processor-in-the-Loop (PIL) testing. The simulation environment 100, the code generator 124, and the compiler 126 may be run on a data processing device 134, such as a workstation. In some embodiments, the executable 130 may be executed on the data processing device 134 separately from the simulation environment 100, e.g., for Software-in-the Loop (SIL) testing.

The WCET analysis system 200 may determine the WCET for the simulation model 300 and/or the generated code 128. The options 120 may include information for directing and/or controlling the worst case execution time (WCET) analysis as performed by the WCET analysis system 200. For example, the options 120 may identify the hardware platform 132 for which the WCET is to be determined.

It should be understood that the simulation environment 100 of FIG. 1 is intended for illustrative purposes only and that the present disclosure may be used with other simulation or modeling environments having different architectures and/or additional or fewer components.

Figure 2:
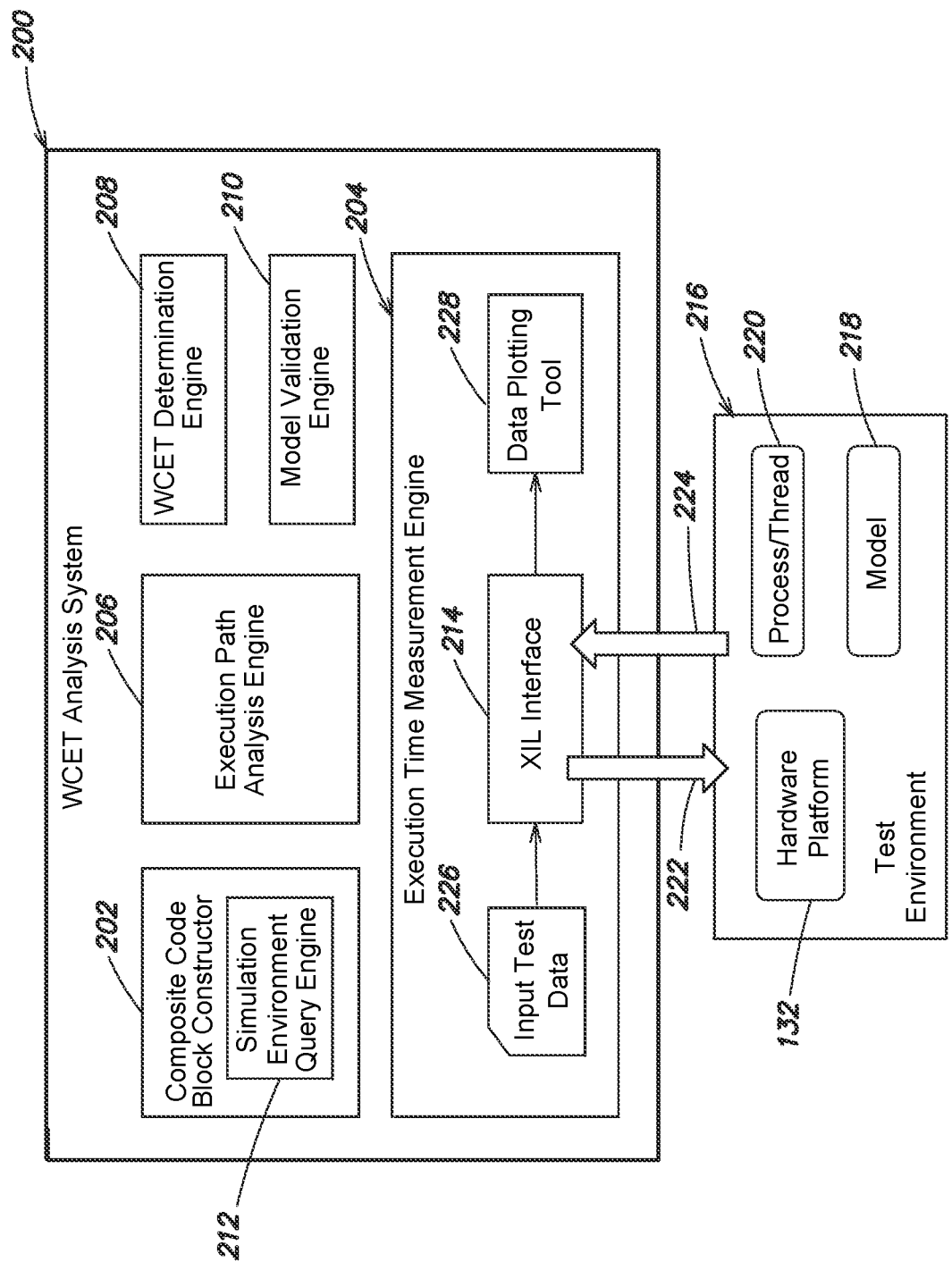
FIG. 2 is a schematic functional illustration of an example of a Worst Case Execution Time (WCET) analysis system in accordance with one or more embodiments.

FIG. 2 is a schematic functional illustration of an example of the WCET analysis system 200 in accordance with one or more embodiments. The WCET analysis system 200 may include a composite code block constructor 202, an execution time measurement engine 204, an execution path analysis engine 206, a WCET determination engine 208, and a model validation engine 210. The composite code block constructor 202 may include a simulation environment query engine 212. The execution time measurement engine 204 may include an X-in-the-Loop (XIL) interface element 214 that may interface with a test environment 216. The test environment 216 may include or be the hardware platform 132 for supporting Hardware-in-the Loop (HIL) or Processor-in-the-Loop (PIL) testing, a model 218 for supporting Model-in-the-Loop (MIL) testing, or one or more processes or threads 220 running on the data processing device 134 for supporting Software-in-the-Loop (SIL) testing. The 'X' in the XIL interface element 214 may thus stand for H (Hardware), P (Processor), M (Model), or S (Software). The XIL interface element 214 may be configured to communicate with the test environment 216, as indicated by arrows 222 and 224. For example, the XIL interface element 214 may receive input test data 226 and provide it to the test environment 216. The XIL interface element 214 may also provide information received from the test environment 216 to one or more components, such as a data plotting tool 228, the WCET determination engine 208, etc.

In some embodiments, the WCET analysis system 200 or portions thereof may be implemented through one or more software modules or libraries containing program instructions that perform the methods described herein, among other methods. The software modules may be stored in one or more memories, such as a main memory, a persistent memory, and/or a computer readable media, of the data processing device 134, and may be executed by one or more processors. Other computer readable media may also be used to store and execute these program instructions, such as one or more non-transitory computer readable media, including optical, magnetic, or magneto-optical media. In other embodiments, the WCET analysis 200 or portions thereof may be implemented in hardware, for example through hardware registers and combinational logic configured and arranged to produce sequential logic circuits that implement the methods described herein. In other embodiments, various combinations of software and hardware, including firmware, may be utilized to implement the systems and methods of the present disclosure.

The executable simulation model 300, the generated code 128, and the executable 130 may be stored in one or more computer memories as one or more data structures, such as files, objects, linked lists, etc.

Exemplary solvers 114 include one or more fixed-step continuous solvers, which may utilize integration techniques based on Euler's Method or Huen's Method, and one or more variable-step solvers, which may be based on the Runge-Kutta and Dormand-Prince pair. A description of suitable solvers may be found in the *Simulink User's Guide* from The Math Works, Inc. (March 2022 ed.).

Exemplary code generators 124 include the Simulink Coder, the Embedded Coder, and the Simulink PLC Coder products from The Math Works, Inc. of Natick, MA, and the TargetLink product from dSpace GmbH of Paderborn Germany. Exemplary code 128 that may be generated for the executable simulation model 300 includes textual source code compatible with a programming language, such as the C, C++, C#, Ada, Structured Text, Fortran, PLC, e.g., structured text or ladder diagram code, CUDA, Open Computing Language (OpenCL), and MATLAB languages, among others. Alternatively or additionally, the generated code 128 may be (or may be compiled to be) in the form of object code or machine instructions, such as an executable, suitable for execution by a target device of an embedded system, such as a central processing unit (CPU), a Graphics Processing Unit (GPU), a microprocessor, a digital signal processor, etc. The generated code 128 may be stored in memory, such as a main memory or persistent memory or storage, of the data processing device 134.

It should be understood that the WCET analysis system 200 system of FIG. 2 is intended for illustrative purposes only and that the present disclosure may be implemented in other ways. For example, one or more portions of the WCET analysis system 200 may be incorporated in other elements of the simulation environment 100, such as the simulation engine 108. In addition, elements of the WCET analysis system 200 illustrated as being separate may be combined into a single element and a single element may be separated into multiple elements.

Figure 3:
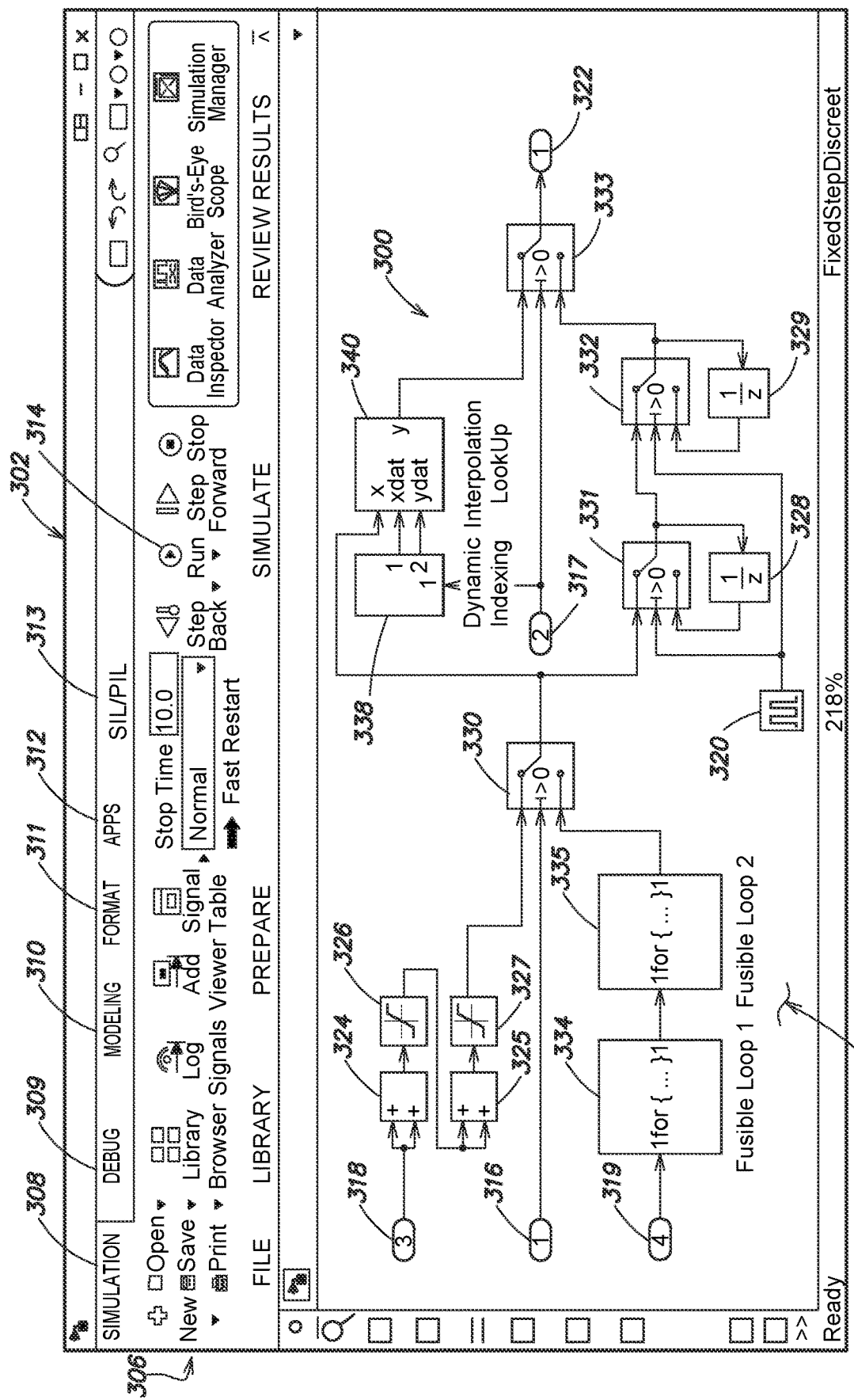
FIG. 3 is an illustration of an example simulation model in accordance with one or more embodiments.

FIG. 3 is an illustration of the example simulation model 300 in accordance with one or more embodiments. The simulation model 300 may be opened by the simulation environment 100 and visually presented on a display of the data processing device 134. For example, the UI engine 102 may generate a model editor 302, e.g., a window for display by a data processing device, that includes a canvas 304, and the model 300 may be presented on the canvas 304. In addition to the canvas 304, the model editor 302 may include a toolstrip 306 with a plurality of tabs 308-313 named 'Simulation', 'Debug', 'Modeling', 'Format', 'Apps', and 'SIL/PIL. Each tab on the toolstrip 306, when selected, may present a set of command buttons for performing desired actions. In FIG. 3, the 'Simulation' tab 308 is selected. The 'Simulation' tab 308 may include a Run button 314. In response to a user selecting the Run button 314, the simulation engine 108 may execute the simulation model 300.

To construct or edit a model, such as the model 300, the UI engine 102 may present one or more palettes that present various model element types from the model element library 106. In response to user selection of desired model element types from the palettes, the model editor 104 may place instances, e.g., blocks, of the selected model element types onto the model canvas 304. The model editor 104 also may establish relationships, such as connections, among the model elements, for example in response to user input connecting particular model elements. The connections may or may not be visually represented on the model canvas 304. Elements of the model 300 may represent dynamic systems, computations, functions, operations, data stores, events, states, state transitions, etc., and the connections, which if visible may appear as arrows or lines, may represent data, control, signals, events, mathematical relationships, state transitions, physical connections, etc. In some embodiments, the model 300 may be a time-based block diagram.

A group of model elements may be contained within a component of the model. Exemplary components include superblocks, subsystem blocks, model reference blocks, sub-models, state charts, subcharts, Virtual Instruments (VIs), subVIs, etc. A component may be visually represented within the model as a single element, such as a subsystem block or a model reference block. While these block types may help organize a model graphically by establishing hierarchy, they may play no active role in the simulation of the model, but may instead, and may be referred to as virtual blocks. Model elements that do play an active role in the simulation of a model may be referred to as non-virtual blocks. A component may itself contain other components, establishing multiple hierarchical levels within a model. Components may include input ports and output ports, and input/output dependencies may extend across hierarchical levels of a model.

The simulation model 300 includes a plurality of interconnected model elements. For example, the model 300 includes four Inport source blocks 316-319 labeled '1', '2', '3', and '4', a Pulse Generator source block 320, and one Outport sink block 322 labeled '1'. The model 300 further includes two Sum blocks 324 and 325, two Saturation blocks 326 and 327, two Unit Delay blocks 328 and 329, and four Switch blocks 330-333. The model 300 also includes two For Iterator subsystem blocks 334 and 335, a Subsystem block 338 labeled 'Dynamic Indexing', and an Interpolation Using Prelookup block 340. As shown, the blocks are interconnected by arrows that represent mathematical relationships, such as signals, between connected blocks where a first, e.g., source, block updates the signal, and a second, e.g., sink, block reads the signal. A signal may refer to a time varying quantity having one or more values, for example at all points in time during model execution. A signal may have a value at each time step during execution of a model.

The model 300 may define a plurality of data and/or control paths that may lead from top level inputs to top level outputs of the model 300. One or more model elements, e.g., blocks, may be disposed along the paths through the model. Any one of these paths may represent the WCET during execution of the model 300. Code generated for the model 300 will similarly include a plurality of data and/or control paths. One or more functions at least some of which may represent model elements of the model 300 may be disposed along the paths through the generated code.

For purposes of explanation, portions of the present disclosure make reference to model elements, such as blocks, of the Simulink® modeling environment from The Math Works, Inc. This is not intended as limiting and as noted, it should be understood that the present disclosure may be used with other modeling environments supporting other elements. The simulation model 300, moreover, is meant for explanation purposes and the present disclosure may be used with other models, such as larger and/or more complex models.

FIGS. 4A-E are partial views of a flow diagram of an example method for performing worst case execution time analysis in accordance with one or more embodiments. It should be understood that the flow diagrams described herein are representative only. In some embodiments, one or more steps may be omitted, one or more steps may be optionally performed, multiple steps may be combined or consolidated, additional steps may be added, the order of steps may be changed, and/or one or more sequences as indicated by the arrows of the flow diagram may be omitted, among other alternatives.

The WCET analysis system 200 may access a simulation model, such as the executable simulation model 300, to be analyzed, as indicated at step 402. For example, a user may select a command presented on a drop down menu of the model editor 302 requesting a determination of the worst case execution time (WCET) for the executable simulation model 300. The WCET analysis system 200 also may receive one or more options for controlling the WCET analysis, as indicated at step 404. The one or more options 120 may be entered through user interface elements, such as data entry boxes or fields, checkboxes, etc., of a dialog presented in response to the selection of the WCET command and/or options may be stored in one or more configuration files accessible by the WCET analysis system 200.

Figure 5:
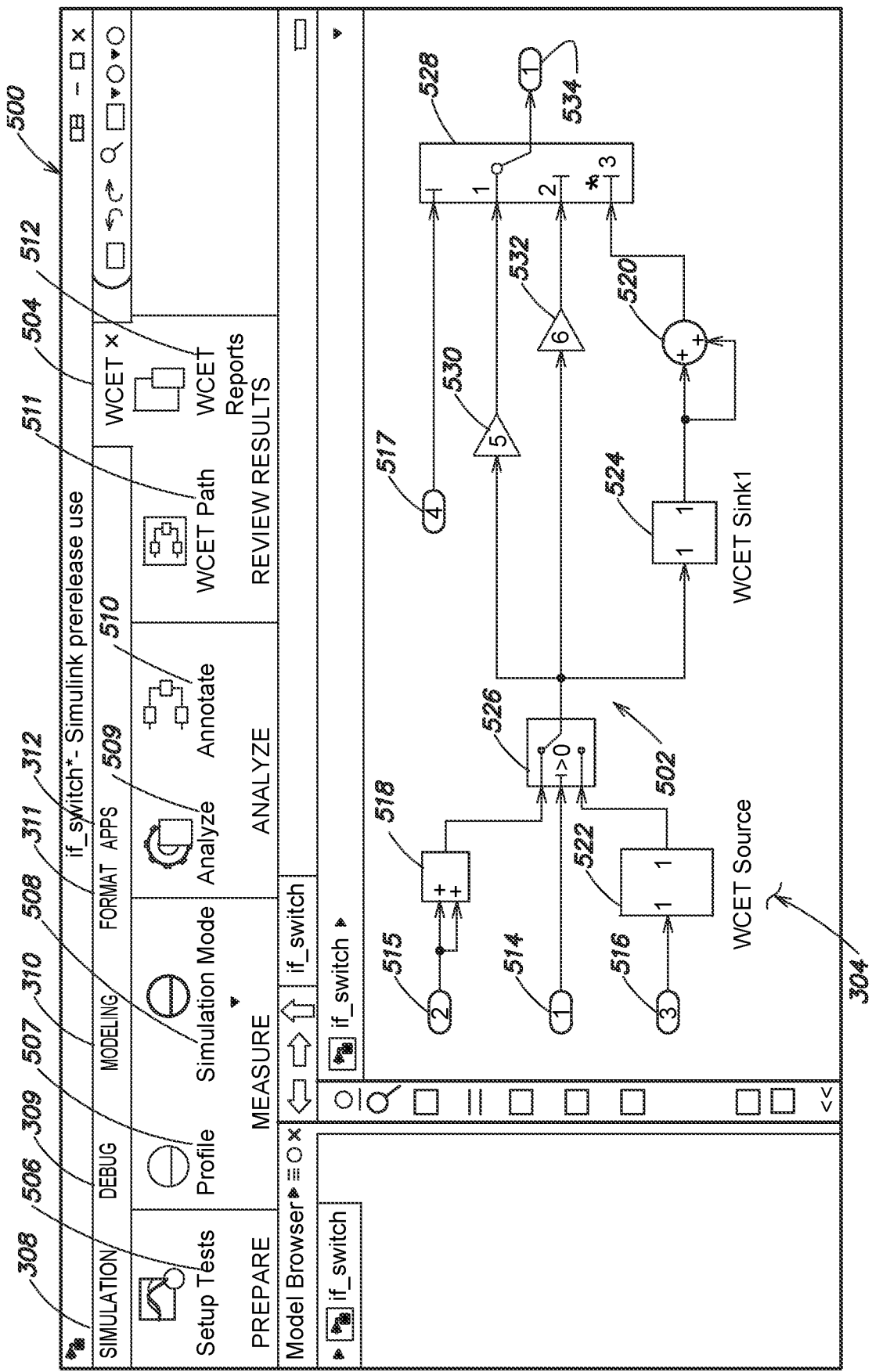
FIG. 5 is an example model editor window in accordance with one or more embodiments.

FIG. 5 is an example model editor 500 that may be presented on a display of a data processing device in accordance with one or more embodiments. The model editor 500 may include the canvas 304 and the tabs 308-312. A simulation model 502 may be presented on the canvas 304. In some embodiments, the WCET analysis system 200 may be implemented as an application (app) of the simulation environment 100. The WCET app may be accessed, e.g., by a user, from the Apps tab 312. In response to opening the WCET app, the UI engine 102 may present a WCET tab 504 on the model editor 500, which may provide one or more command buttons for operating the WCET app, such as buttons 506-512 named 'Setup Tests', 'Profile', 'Simulation Mode', 'Analysis', 'Annotate', 'WCET Path', and 'WCET Reports'. In some embodiments, the command buttons may be organized into sub-tabs under the WCET tab 504. As illustrated, exemplary sub-tabs include 'Prepare', 'Measure', 'Analyze', and 'Review Results'.

The 'Setup Tests' button 506 may be used to associate one or more tests for running the WCET analysis on the simulation model 502 opened and presented on the canvas 304. For example, the one or more tests may include sample input data that is processed by the simulation model 502 to determine the model's WCET. Selection of the 'Profile' button 507 may start the WCET analysis process for the simulation model 502 presented on the canvas 304, which may include generating code for the model 502, creating composite code blocks, and instrumenting the composite code blocks. In some embodiments, the 'Simulation Mode' button 508 may configure the simulation engine 108 to run a simulation model in one or more simulation modes. For example, the simulation engine of the Simulink® modeling environment can run a model in Normal mode, Accelerator mode, and Rapid Accelerator mode. Selection of the 'Analyze' button 509 may direct the WCET analysis system 200 to determine the WCET for a model, e.g., following selection of at least the 'Profile' button 507. Selection of the 'Annotate' button 510 may direct the WCET analysis system 200 to annotate the model 502 and/or the code generated for a model with information from the WCET analysis. Selection of the 'WCET Path' button 511 may direct the WCET analysis system 200 to mark the WCET path in the model 502 and/or the code generated for the model 502. Selection of the WCET Reports button 512 may direct the WCET analysis system 200 to generate one or more reports regarding the WCET analysis. It may also direct the WCET analysis system 200 to generate artifacts that may be used to perform other analysis of the model 502, such as real-time safety standard certification, performance engineering, etc.

It should be understood that the command buttons 506-512 are presented for illustrative purposes and that the WCET analysis of present disclosure may conducted through the use of other and/or additional command buttons or without the use of command buttons at all.

The simulation model 502 may include a plurality of model elements, e.g., blocks, at least some of which may be interconnected to define the functionality of the simulation model 502. For example, the model 502 may include four Inport blocks 514-517, a Sum block 518, an Add block 520, two Subsystem blocks 522 and 524 named 'WCET Source' and 'WCET sink1', a Switch block 526, a Multiport Switch block 528, two Gain blocks 530 and 532, and an Outport block 534.

Following selection of the 'Profile' button 507, the IR builder 114 may create one or more in-memory, Intermediate Representations (IRs) for the simulation model 300, as indicated at step 406. The IR may be in the form of a graph, such as a Control Flow Graph (CFG), a Data Flow Graph (DFG), or a Control Data Flow Graph (CDFG). A Control Flow Graph (CFG), for example, is a graph representation of the computation and control flow in a program. To create the CFG, code sequences of the program are coalesced into basic code blocks. As stated earlier, a basic code block is a linear sequence of instructions that is entered only at the first instruction and can only be exited from the last instruction. As basic code blocks contain no branches except at the last instruction, they may be executed as units. The basic code blocks become the nodes of the CFG. The edges of the CFG indicate the flow of control among the nodes, e.g., between two or more basic code blocks. For example, if control can pass from a first basic code block to a second basic code block, then an edge of the CFG connects the first and second basic code blocks. The edges of a CFG, DFG, or a CDFG may represent control or data dependencies among the basic code blocks. In some embodiments, the IR may be in a form from which source code for the simulation model may be generated, for example by a back-end processing unit of the code generator 124.

The IR builder 114 also may construct a tree, such as a Program Structure Tree (PST), from the IR or graph, as indicated at step 408. The PST may be a metadata structure constructed on top of the IR, and may extract structures in a program, e.g., the simulation model 300. A PST is a hierarchical representation of the control structure of a program, e.g., the simulation model 300. The nodes of the PST may represent single entry single exit (SESE) fragments or regions and edges of the PST may represent nesting regions. As stated earlier, each SESE fragment or region may be a basic code block, a case construct, a loop, a directed acyclic graph (DAG), or a cyclic unstructured region. As a result, analysis of the PST can be implemented abstractly and efficiently. Suitable PSTs are described in the paper R. Johnson et al. *The Program Structure Tree: Computing Control Regions in Linear Time* ACM SIGPLAN Notices, Vol. 29, Issue 6 (June 1994) pp. 171-185.

The composite code constructor 202 may traverse the PST and evaluate one or more, and preferably all, of its nodes, as indicated at step 410. As described, the nodes of the PST may represent basic code blocks. The composite code block constructor 202 may trace one or more of the basic code blocks of the PST to the simulation model 300, as indicated at step 412. For example, at least some of the basic code blocks of the PST may correspond to model elements of the simulation model 300. One or more of the IRs and/or the PST, moreover, may include information indicating which model elements the basic code blocks correspond to. An exemplary technique for tracing between an intermediate representation and a simulation model is described in U.S. Pat. No. 8,104,017 for Traceability in a Modeling Environment to The Math Works, Inc.

Figure 4A:
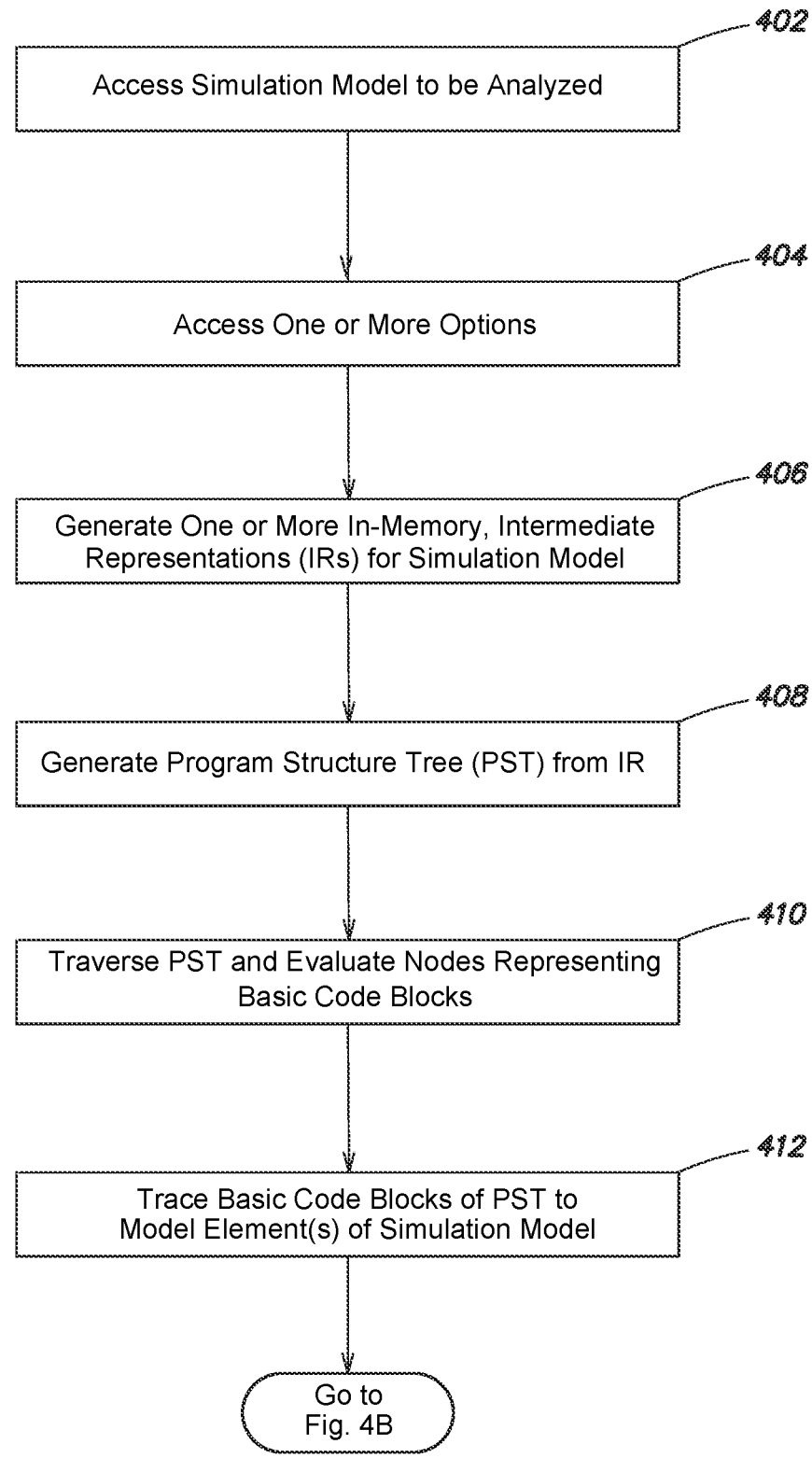
FIGS. 4A-E are partial views of a flow diagram of an example method for performing worst case execution time analysis in accordance with one or more embodiments.
Figure 4B:
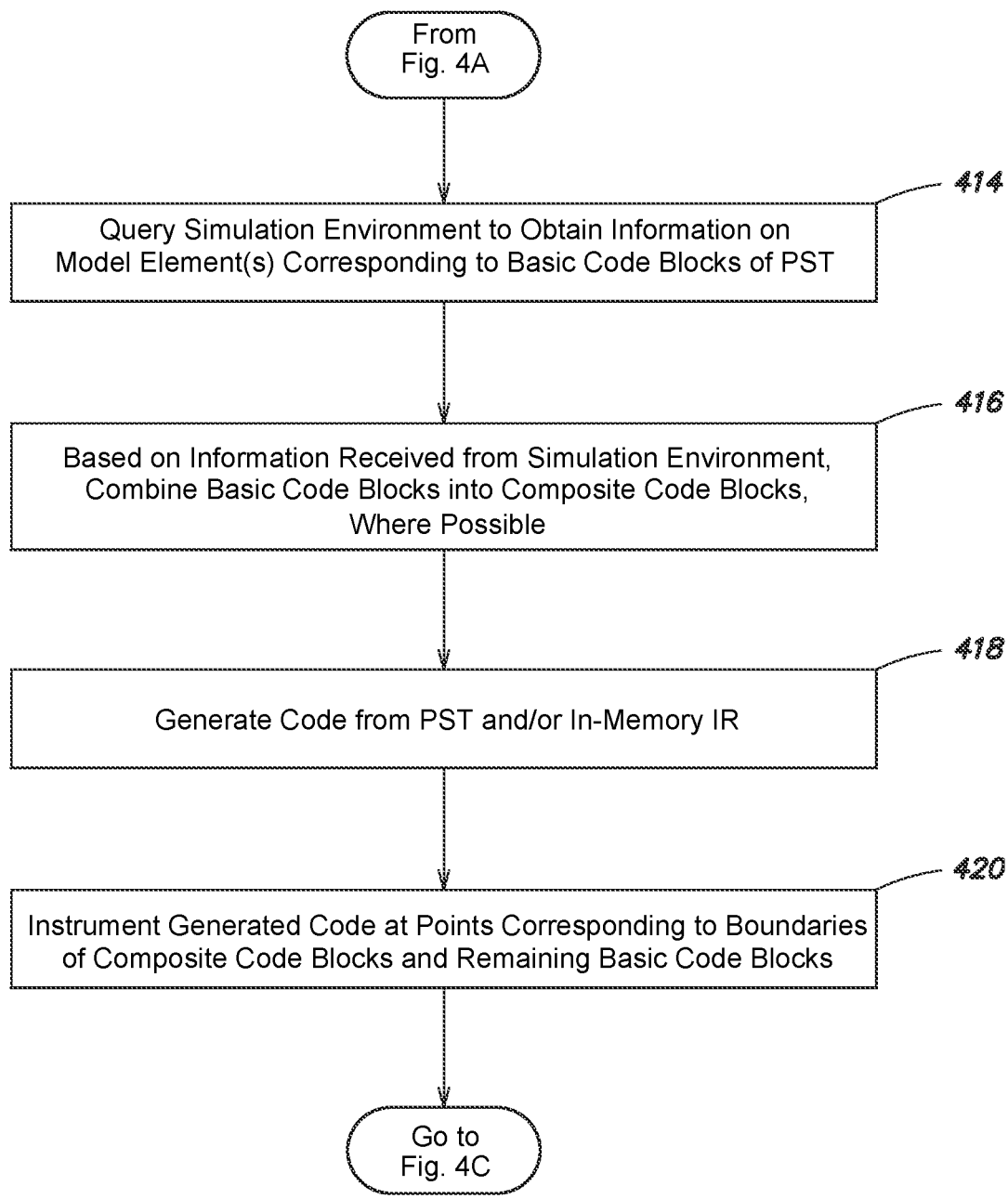

The simulation environment query engine 212 may query the simulation environment 100 to obtain information on the simulation model 100 and/or on the model elements to which one or more basic code blocks are traced, as indicated at step 414 (FIG. 4B). The simulation environment 100 may provide access to such information through an Application Programming Interface (API), and the simulation environment query engine 212 may utilize the API to obtain information on the simulation model 300 and/or one or more model elements thereof. The composite code block constructor 202 may utilize the information obtained from the simulation environment 100 to combine two or more basic code blocks into a composite code block, as indicated at step 416. Like a basic code block, a composite code block is a sequence of instructions that is entered only at the first instruction, can only be exited from the last instruction, and contains no branches except possibly at the last instruction. A composite code block may be linear or it may include one or more loops.

For example, a simulation model may include a hierarchical model element that repeats its execution for some number of iterations during model execution. The number of iterations may be represented by a variable in the sequence of instructions included in the graph or PST. As a result, the hierarchical mode element may be represented by multiple basic code blocks implementing for loops in the graph or PST. The composite code block constructor 202 may trace the sequence of instructions to the hierarchical model element, and the simulation environment query engine 212 may query the simulation model for initialization information on the hierarchical model element. The initialization information may indicate that the number of iterations is fixed or has a bound, e.g., an upper limit. Accordingly, the composite code block constructor 202 may combine the sequence of instructions for these multiple basic code blocks into a composite code block. As another example, the graph or tree may include a sequence of instructions implementing conditional execution contexts, such as If conditional statements. The sequence of instructions may be represented by multiple basic code blocks in the graph or tree. The composite code block constructor 202 may trace the conditional execution contexts back to the simulation model, and through the simulation environment query engine 212 may determine that they are all associated with a single switch element or trigger condition of the simulation model. Accordingly, the composite code block constructor 202 may combine these multiple basic code blocks into a composite code block.

As another example, a common saturation logic of a simulation model may take the form of If (y>=MAX) {
　y=MAX;
}

The composite code block constructor 202 may combine such saturation logics into parent composite code blocks, because the worst case is known statically. More generally, the composite code block constructor 202 may combine basic code blocks with known worst-case execution times into a composite code block. For example, a Lookup Table (LUT) block of a simulation model will typically have a known worst-case execution time, which is when the item being located is at the end of the linear search performed by the LUT block.

The composite code block constructor 202 may also merge continuous loops identified in a model. For example, suppose the code for a model includes the following two For loops, which are not nested loops:

For (i=0:1:t) { . . . }
For (i=t:1:100) { . . . }

The first For loop iterates from zero to 't' in increments of 1. The first for loop is thus a variable-bounded loop. The second For loop iterates from 't' to 100 in increments of 1. The second For loop is thus also a variable-bounded loop. The presence of variable-bounded For loops, such as the above For loops, can present challenges for WCET analyzers. In some embodiments, however, the composite code block constructor 202 may merge these two For loops into a single composite code block, which iterates from zero to 100. The query engine 212 may query the simulation model to determine the characteristics of the variables 't' and 100. The query engine 212 may obtain information from the model indicating that 't' is a variable, but 100 is a constant. Based on this information from the model, the WCET determination engine 208 may consider this composite code block to be a bounded For loop that is bounded by the constant 100.

In some embodiments, the code generator 124 may generate code for a model in a manner that facilitates combining the code into composite code blocks by the composite code block constructor. For example, the statements of the generated code may be arranged, e.g., ordered, in many different ways that are all semantically correct. In some embodiments, the code generator 124 may arrange the statements in the generated code to eliminate or reduce variable life-range overlap.

Figure 6:
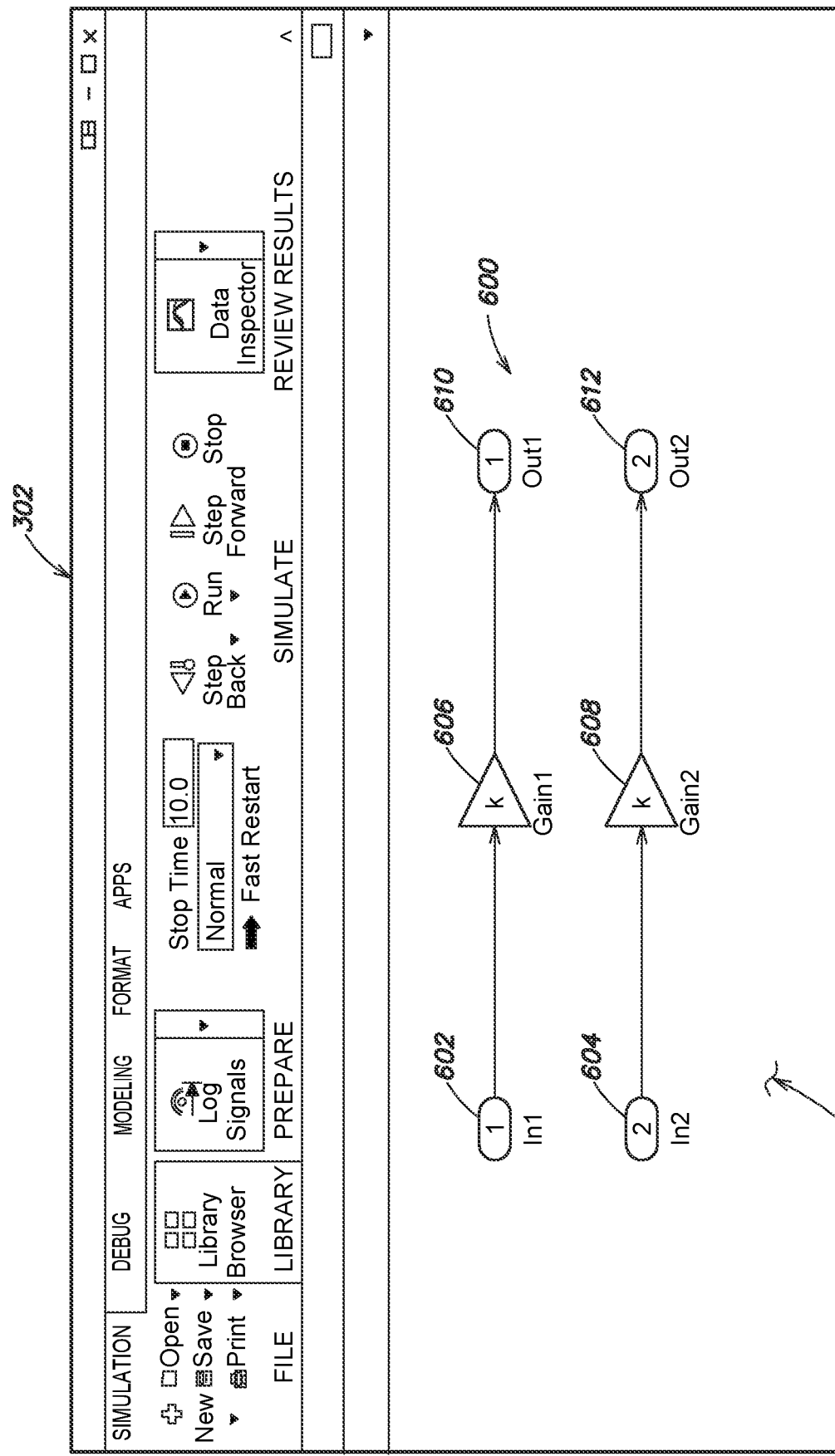
FIG. 6 is an illustration of another example simulation model in accordance with one or more embodiments.

FIG. 6 is a is an illustration of the example simulation model 600 presented on the canvas 304 of the model editor 302 in accordance with one or more embodiments. The simulation model 300 may be opened by the simulation environment 100 and visually presented on a display of the data processing device 134. The simulation model 600 may include two Inport blocks 602 and 604, two Gain blocks 606 and 608, and two Outport blocks 610 and 612. It should be understood that code generated for the simulation model 600 may take different forms that are all semantically correct. In one embodiment, the generated code may include the following sequence of statements:

gain1=in1*k;
out1=gain1;
gain2=in2*k;
out2=gain2;

In another embodiment, the generated code may include the following sequence of statements:

gain1=in1*k;
gain2=in2*k;
out1=gain1;
out2=gain2;

It should be understood that other sequences of statements is also possible.

In some embodiments, the code generator 124 may be configured to generate code such that the variables referenced in the statements have reduced variable live-range, as illustrated in the first example above. As mentioned, the live range of a variable may refer to the distance between the definition of the variable and the uses of the variable. For example, comparing the first four statements above to the second four statements, gain1 has shorter live range in the first sequence of statements because it is used right after it is defined. The code generator 124 may also be configured to generate code such that variables across control-flows also have reduced live-range which could reduce the cost and potentially improve the precision of flow-sensitive WCET analysis.

In some embodiments, the composite code block constructor 202 may be configured not to combine certain sequences of If statements included in the code generated for a model, but to combine other sequences. For example, the composite code block constructor 202 may be configured not to combine the following sequence of If statements appearing in the generated code:

If a
　statement1
　. . .
If b
　statement2
　. . .
If a
　statement3
　. . .
If b
　statement4
　. . .

Combining the above example of If statements would require the WCET determination engine 208 to consider sixteen possible code paths and analyze all eight true/false branches to reduce the feasible paths down to four.

However, the composite code block constructor 202 may be configured to combine the following If statements included in code generated for a model into a single composite code block:

{If a
　statement1
　. . .
If a
　statement3
　. . .
}
{If b
　statement2
　. . .
If b
　statement4
　. . .
}

Here, the WCET determination engine 208 may start with four possible code paths, avoiding the analysis of sixteen possible code paths as presented by the first example above. As shown, after combining, the first two If statements could be treated as having only two possible control flow paths starting from the first If statement: true→true and false→false.

Figure 7:
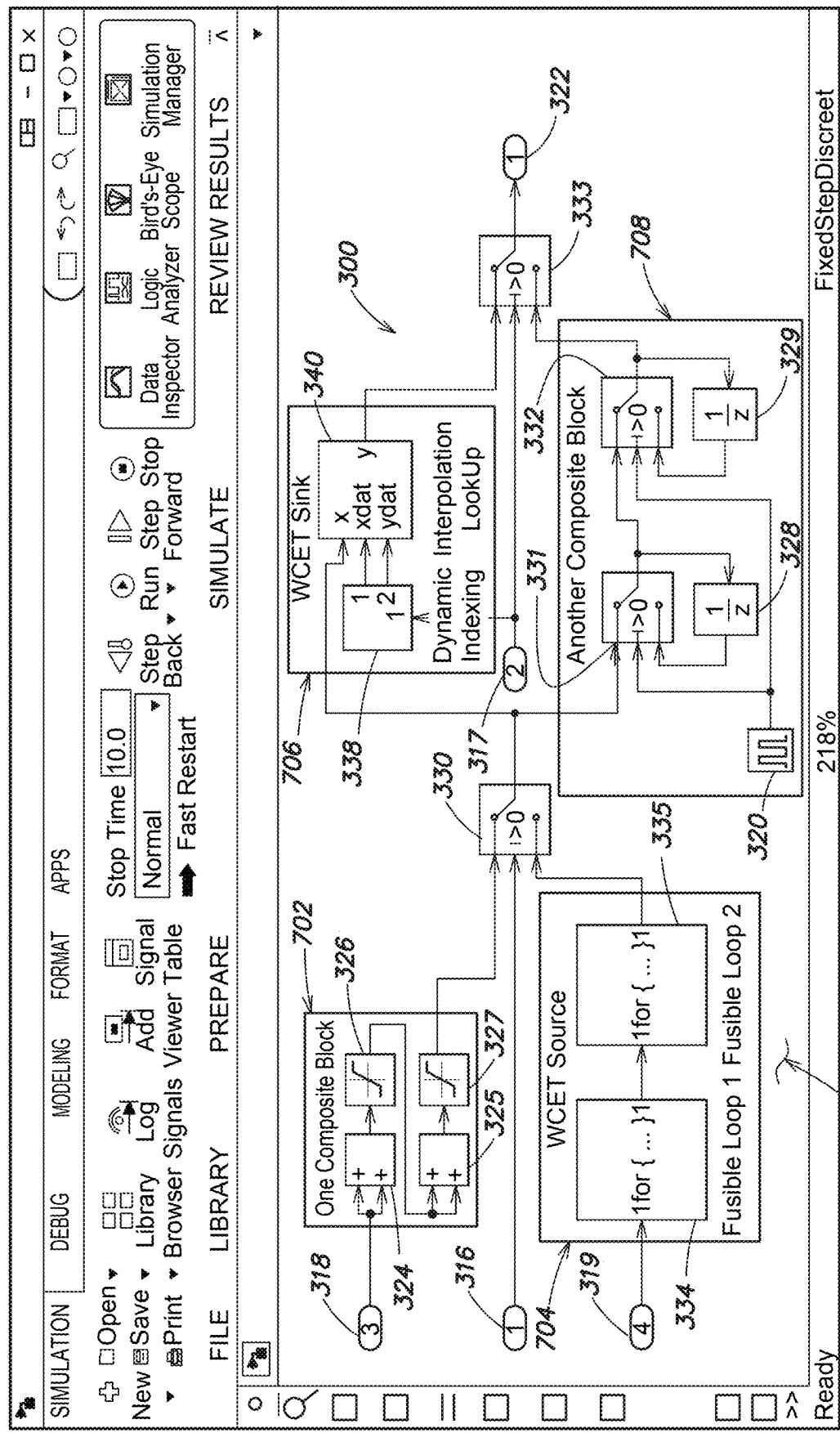
FIG. 7 is an illustration of a simulation model showing the construction of composite code blocks in accordance with one or more embodiments.

FIG. 7 is an illustration of the simulation model 300 marked to show the construction of composite code blocks by the composite code block constructor 202 in accordance with one or more embodiments. As illustrated, blocks 324-327 have been merged into a composite model element 702 labeled 'One Composite Block'. Blocks 334 and 335 have been merged into a composite model element 704 labeled 'WCET Source'. Blocks 338 and 340 have been combined to form a composite model element 706 labeled 'WCET Sink'. Blocks 320, 328, 329, 331, and 332 have been merged into a composite model element 708 labeled 'Another Composite Block'.

In addition to creating composite code blocks through an analysis of basic code blocks of the code path, the composite code block constructor 202 may construct composite code blocks in other ways, such as at the algorithmic level. For example, the composite code block constructor 202 may be configured to construct composite code blocks from one or more layers of a Deep Learning (DL) neural network. For example, the simulation model 300 may include one or more layers of a DL neural network. Exemplary layers include convolution layers, fully connected layers, activation layers, normalization layers, pooling layers, and unpooling layers, among others. Network layers may be defined based on the semantics and/or modeling constructs utilized by the simulation environment 100. For example, the simulation environment 100 may include predefined functions for creating particular layers of a DL neural network. Exemplary functions include the fullyConnectedLayer, convolution1dLayer, and the reluLayer functions of the MATLAB® program development environment. The composite code block constructor 202 may search for such functions in the IR and/or PST for a model and may designate the code corresponding to the functions in the IR and/or PST as composite code blocks.

Returning to FIG. 4B, the code generator 124 may generate code from the one or more IRs and/or PST analyzed by the composite code block constructor 202, as indicated at step 418. When producing code for a model, the code generator 124 may define a set of entry-point functions that may be called to execute the generated code. An entry point is a location in code where a transfer of program control (execution) occurs. The main function (main ( )) is the entry point to a C/C++ program and is called when the application starts executing. Calls to other functions, for example from the main function, provide entry points to function code. Program control is transferred to the called function. The function code executes, and when finished, returns control to the main or other calling function. The generated functions may be called, for example, from external code or from a version of the generated function, e.g., by a user.

The execution time measurement engine 204 may instrument the generated code at the boundaries of the composite code blocks and at the boundaries of any remaining basic code blocks, as indicated at step 420. Suitable functionality for instrumenting a model or code generated for a model is included in the Embedded Coder tool from The Math Works, Inc. in connection with the 'Measure task execution time' feature.

Figure 4C:
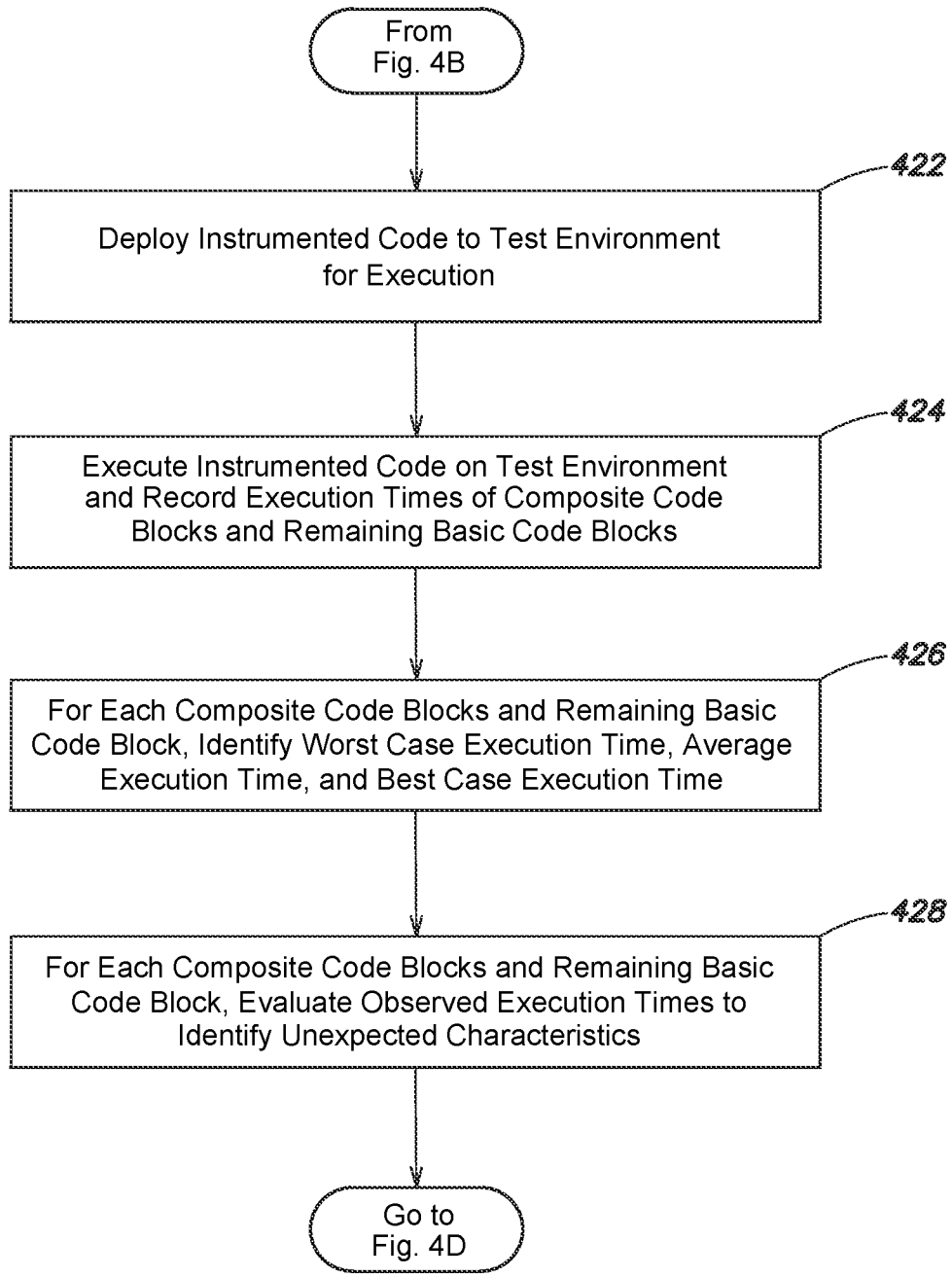

The compiler 126 may compile the instrumented code, and the execution time measurement engine 204 may deploy the instrumented code to the test environment 216, as indicated at step 422 (FIG. 4C). More specifically, the generated code may be compiled and deployed to and executed by a microprocessor, a digital signal processor (DSP), or other processing logic of the test environment 216.

In response to selection of the 'Analyze' button 509 (FIG. 5), the execution time measurement engine 204 may direct the test environment 216 to execute the instrumented code, as indicated at step 424. During execution, the XIL interface 214 may provide the input test data 226 to the test environment 216 and observe the execution times of the composite code blocks and any remaining basic code blocks by virtue of the instrumentation of the generated code, as also indicated at step 424. In some embodiments, the input test data 226 may be created to perform coverage testing of the generated code on the test environment 216 according to one or more coverage metrics, such as the MC/DC coverage metric. The execution time measurement engine 204 may execute the generated code on the test environment 216 multiple times using the input test data 226, thus generating multiple observed execution times for each composite code block and remaining basic code block. The XIL interface 214 may log the execution times observed for the composite code blocks and any remaining basic code blocks.

In some embodiments, instead of running the generated code in one of the XIL processing modes, the generated code may utilize a transport layer of a communication channel to communicate with the data processing device 134. For example, the generated code may use the communication channel to communicate with the simulation model running in the simulation environment 100. The Simulink® modeling environment and the Simulink Coder product support an External mode in which a communication channel is established between a simulation model and generated code executing on target hardware. Instrumentation code may be incorporated into the generated code as macros, and the macros may be mapped to hardware specific timing log APIs. Execution time measurements observed during execution of the generated code on the test environment 216 may be accessed through post processing of the log. External mode may reduce potential interference by the data processing device 134 and/or the simulation model and may leverage hardware specific instrumentation capabilities of the test environment 216. Accordingly, External mode may improve the accuracy of the execution time measurements of composite code blocks and other blocks. Exemplary communication channels supported by External mode include TCP/IP and serial communication protocols.

The WCET determination engine 208 may determine the WCET for each of the composite code blocks and remaining basic code blocks, as indicated at step 426. In some embodiments, the WCET determination engine 208 may determine one or more additional measurements for the composite code blocks and remaining basic code blocks. For example, the WCET determination engine 208 may also determine the Best-Case Execution Time (BCET) and the average execution time for the composite code blocks and remaining basic code blocks.

While the execution time measurement engine 204 may determine the WCET as well as the BCET and average execution time for each composite code block and remaining basic code blocks, in other embodiments, the execution time measurement engine 204 may determine one or more of the WCET, BCET, or average execution time for fewer than all of the composite code blocks and remaining basic code blocks.

In some embodiments, the data plotting tool 228 may generate a plot of the execution times observed for the composite code blocks and remaining basic code blocks. The WCET determination engine 208 may analyze the data in the plots to determine the WCET, BCET, or average execution time for the composite code blocks and remaining basic code blocks.

Figure 8:
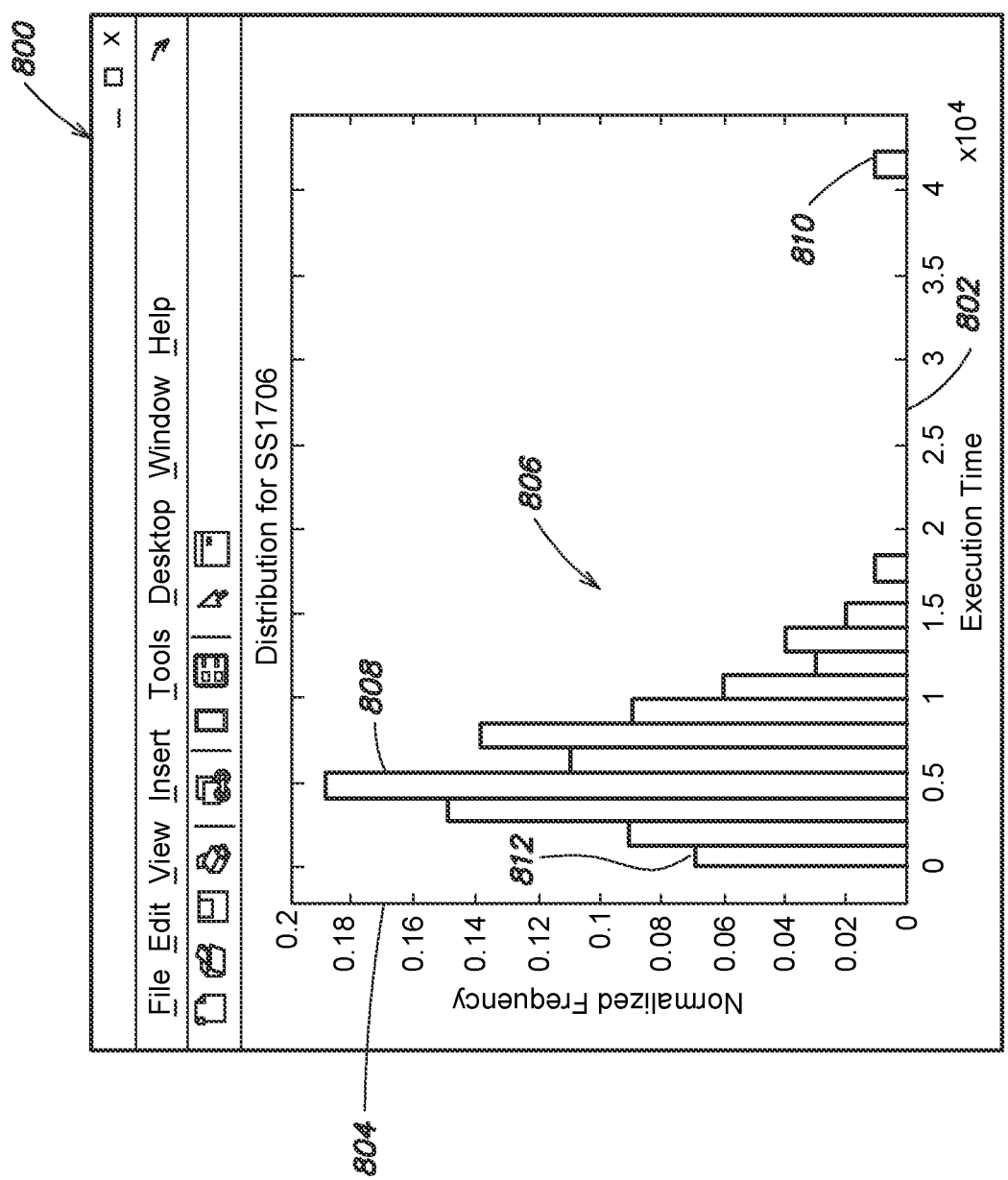
FIG. 8 is an example plot of observed execution times for a composite code block in accordance with one or more embodiments.

FIG. 8 is an example of a plot 800 of observed execution times for a composite code block in accordance with one or more embodiments. The 800 plot may include an x-axis 802 corresponding to execution time, e.g., in milliseconds (ms), and a y-axis 684 corresponding to number of occurrences. As illustrated in FIG. 8, in some embodiments, the y-axis 804 may be normalized frequency of the occurrences by a plurality of execution time measurement buckets. For example, in FIG. 8, the peak frequency indicates that close to 19% of the measurement occurrences fall in the measurement bucket centered around 0.5 millisecond. The observed execution times may be plotted on the plot, producing a distribution 806 of observed execution times. Typically, a distribution of execution times will show a single execution time that occurred most often. Here, the execution time of 0.5 ms, as indicated at 808, occurred most often. A distribution may also present a highest observed execution time, e.g., Worst Case Execution Time (WCET), and a shortest observed execution time, e.g., Best Case Execution Time (BCET). Here, the WCET is approximately 4.2 ms, as indicated at 810, and the BCET is approximately 0.1 ms, as indicated at 812.

It should be understood that other time scales may be used, such as microseconds (μs), nanoseconds (ns), etc., or symbolic scales, such as 'clock periods', 'ticks', etc. In addition, other visualizations may be used besides the histogram or bar chart of FIG. 8, such as a scatter plot.

In some embodiments, the UI engine 102 may present the plot 800 as a popup window over the model editor 302.

In some embodiments, the execution time measurement engine 204 may evaluate the execution times observed for the composite code blocks and the remaining basic code blocks and identify unexpected characteristics in the observed execution times, as indicated at step 428. In some embodiments, the execution time measurement engine 204 may analyze the data plots to determine whether there are unexpected characteristics in the observed execution times.

For example, the execution time measurement engine 204 may evaluate whether the observed execution times demonstrate certain characteristics or patterns. In some embodiments, the execution time measurement engine 204 may determine whether the observed execution times match within a tolerance one or more probability distributions, such as the Normal (Gaussian) distribution, the Gumbel distribution, the Student's t-distribution, etc. For example, the execution time measurement engine 204 may be configured to compare observed execution times with a probability distribution. In some embodiments, the applied probability distribution may be set by default. In other embodiments, a user may select a probability distribution to be applied by the execution time measurement engine 204.

Referring to FIG. 8, the distribution 806 of plot 800 represents a truncated Normal (Gaussian) probability distribution, and thus may not be identified as having unexpected characteristics.

If a distribution does not match, within a tolerance, a given probability distribution, the execution time measurement engine 204 may identify the composite code block as having poor timing predictability or input data sensitivity. The execution time measurement engine 204 may trace the composite code block or basic code block identified as having poor timing predictability or input data sensitivity back to the corresponding blocks of the simulation model.

Figure 9:
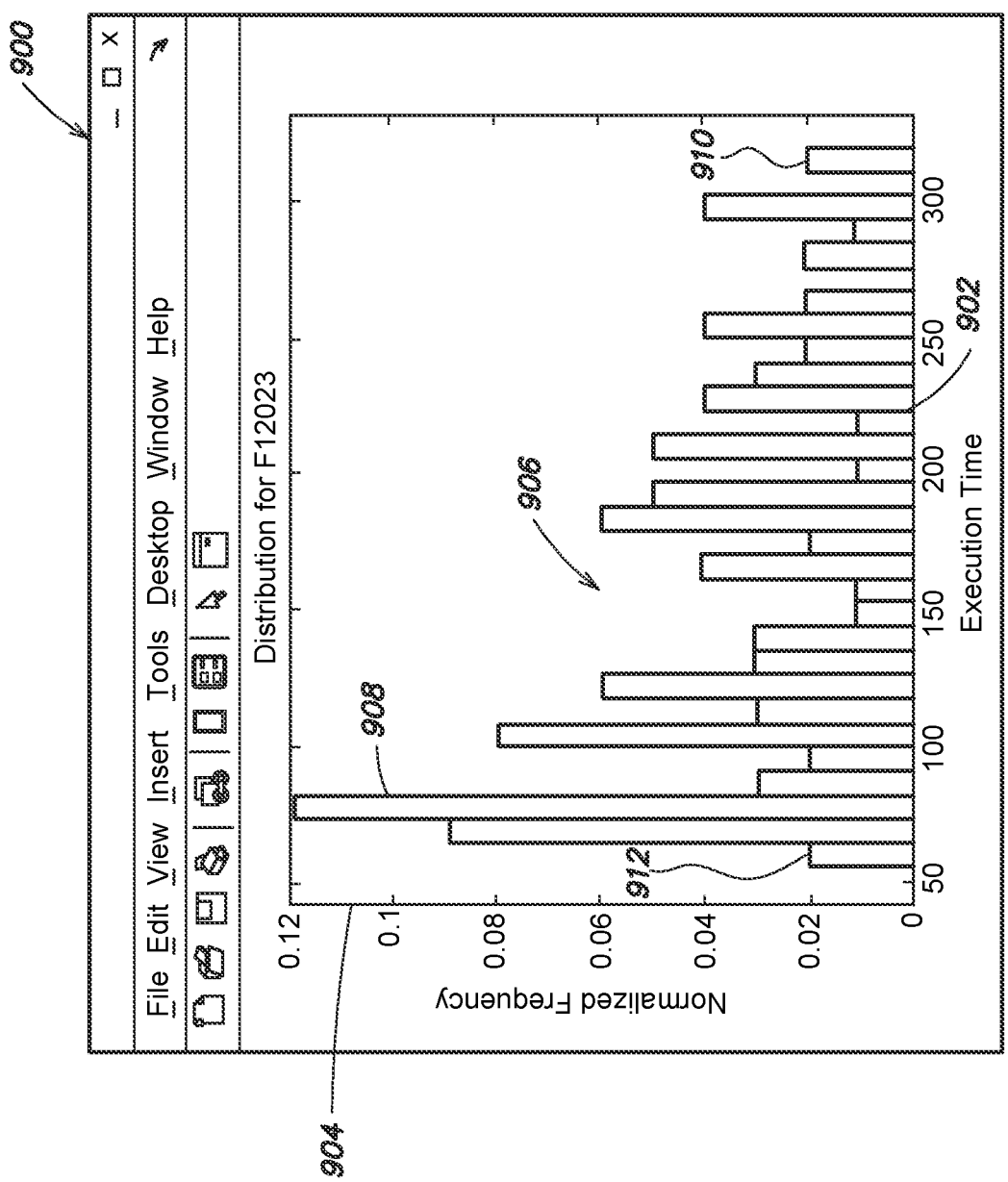
FIG. 9 is another example plot of observed execution times for a composite code block in accordance with one or more embodiments.

FIG. 9 is an example of a plot 900 of observed execution times for another composite code block in accordance with one or more embodiments. The 900 plot may include an x-axis 902 corresponding to execution time, e.g., in microseconds (ms), and a y-axis 904 corresponding to normalized frequency. The observed execution times may be plotted on the plot, producing a distribution 906 of observed execution times. Here, the execution time of 75 ms, as indicated at 908, occurred most often. The plot 906 also includes a WCET of approximately 320 ms, as indicated at 910, and a BCET of approximately 60 ms, as indicated at 912. However, unlike the plot 806 of FIG. 8, the plot 906 does not correspond to the Normal (Gaussian) probability distribution.

Figure 4D:
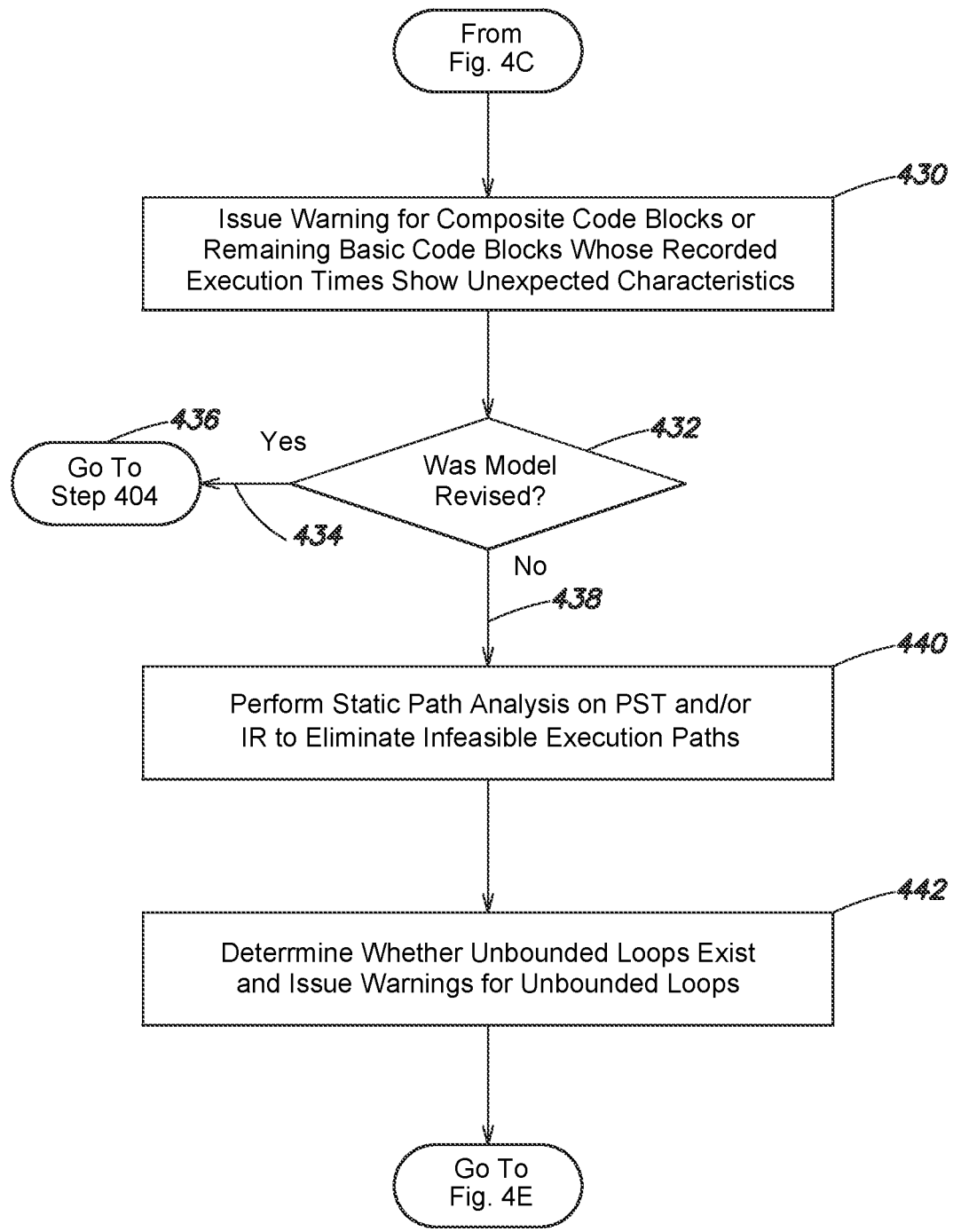
Figure 4E:
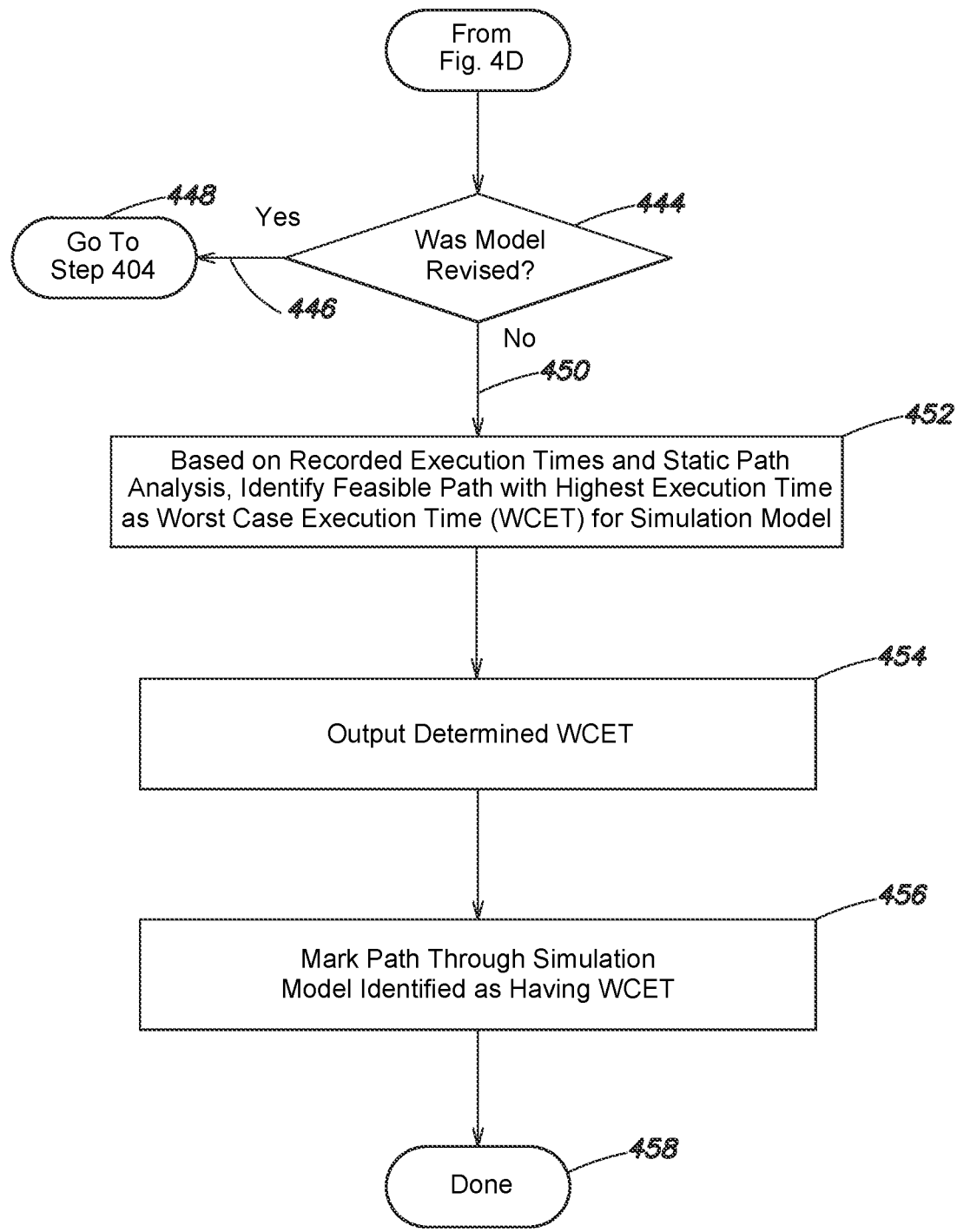

The execution time measurement engine 204 may issue a warning if the observed execution times for a composite code block or a remaining basic code block indicate unexpected characteristics, as indicated at step 430 (FIG. 4D). The warning may identify the model element(s) corresponding to the composite code block or remaining basic code block identified as having unexpected characteristics. In response to the warning, the user may examine evaluate and modify the simulation model 300. For example, if the composite code block having unexpected characteristics maps to an unbounded while loop of the model, the user may introduce an upper bound to the while loop.

In some cases, there may be other dominant variables not accounted for, such as unmodeled hardware timing behaviors or input data sensitivity of the software.

If changes are made to the simulation model, processing may return to step 404, and steps 404-428 may be repeated, as indicated by decision step 432, Yes arrow 434, and Go To step 436.

If changes are not made during this evaluation of the simulation model or a subsequent evaluation of a revised model, then the execution path analysis engine 206 may perform static path analysis on the graph or PST to identify and eliminate infeasible execution paths from further processing, as indicated by No arrow 438 leading to step 440. As noted, a path may refer to a data and/or control path in the graph or PST of the simulation model and/or the code generated for a model. A path is feasible if there exists an input, I, to the simulation model/code such that, when the simulation model/code is executed with I as the input, the path can be taken. A path is infeasible if there exists no input for which that path can be taken. While dead code implies an infeasible path, an infeasible path does not imply dead code.

One technique for identifying infeasible paths is to use symbolic execution. Symbolic execution refers to execution of a program with symbols as arguments. Unlike concrete execution, where the path taken is determined by the input, with symbolic execution, a program can take any feasible path. During symbolic execution, program state consists of symbolic values for memory locations and path conditions. For example, instead of consuming and producing concrete values, computations are performed symbolically, e.g., an add operation applied on symbolic values a and b produces the term a+b. When a conditional control-flow branch is encountered, the current execution is potentially forked into two: one where the path condition is conjoined with the branch-condition, and another where it is conjoined with the negated branch-condition. Path condition is a condition on the input symbols such that, if a path is feasible, its path condition is satisfiable. The solution of a path condition is a test input that covers, e.g., executes, the respective path.

Executions with unsatisfiable path conditions may be abandoned. This may be checked with a constraint solver or automatic theorem-prover. In this way, symbolic execution may provide a systematic way to explore all satisfiable execution paths of a program. Moreover, a path condition may be accumulated along each path.

The execution path analysis engine 206 may also perform Range Analysis, e.g., symbolic range propagation, for the program by symbolically executing the program and abstracting the values of integer variables with symbolic bounds. The goal of Range Analysis may be to collect, at each program statement, a map from integer-typed scalar variables to their symbolic value ranges, represented by a lower bound and an upper bound. In other words, a symbolic value range expresses the relationship between the variables that appear in the range. When used in decision points of the control flow, the variable ranges define the feasible paths.

In some embodiments, the execution path analysis engine 206 may evaluate the graph or PST and determine whether there are unbounded loops and, if so, issue a warning indicating the detection of an unbounded loop, as indicated at step 442. The existence of unbounded loops can make determining a WCET difficult. The execution path analysis engine 206 may trace the unbounded loop to the corresponding model element(s) in the simulation model, and may include an identification of the corresponding model element(s) in the warning. In response, the user may modify the simulation model to remove the unbounded loop condition.

If changes are made to the simulation model 300, processing may return to step 404, and steps 404-428 may be repeated, as indicated by decision step 444 (FIG. 4E), Yes arrow 446, and Go To step 448.

If changes are not made during this evaluation of the simulation model 300 or a subsequent evaluation of a revised model, then the WCET determination engine 208 may determine execution times associated with the feasible paths through the model 300 and/or the generated code 128, and identify the path with the highest execution time as the WCET for the simulation model 300 and/or the generated code 128, as indicated by No arrow 450 leading to step 452. In some embodiments, the WCET determination engine 208 may sum the WCETs measured for the composite code blocks and the remaining basic code blocks along the feasible paths through the model 300 and/or the generated code 128 to determine execution times for the feasible paths. The WCET determination engine 208 may identify the feasible path having the highest total execution time as the WCET for the simulation model 300 and/or the generated code 128.

In some embodiments, the WCET analysis system 200 may output, e.g., present, the WCET determined for the simulation model 300 and/or the generated code 128, as indicated at step 454. For example, the WCET analysis system 200 may mark the path on a visual depiction of the simulation model 300, as indicated at step 456. Processing by the WCET analysis system 200 may then be complete, as indicated by Done step 458.

Figure 10A:
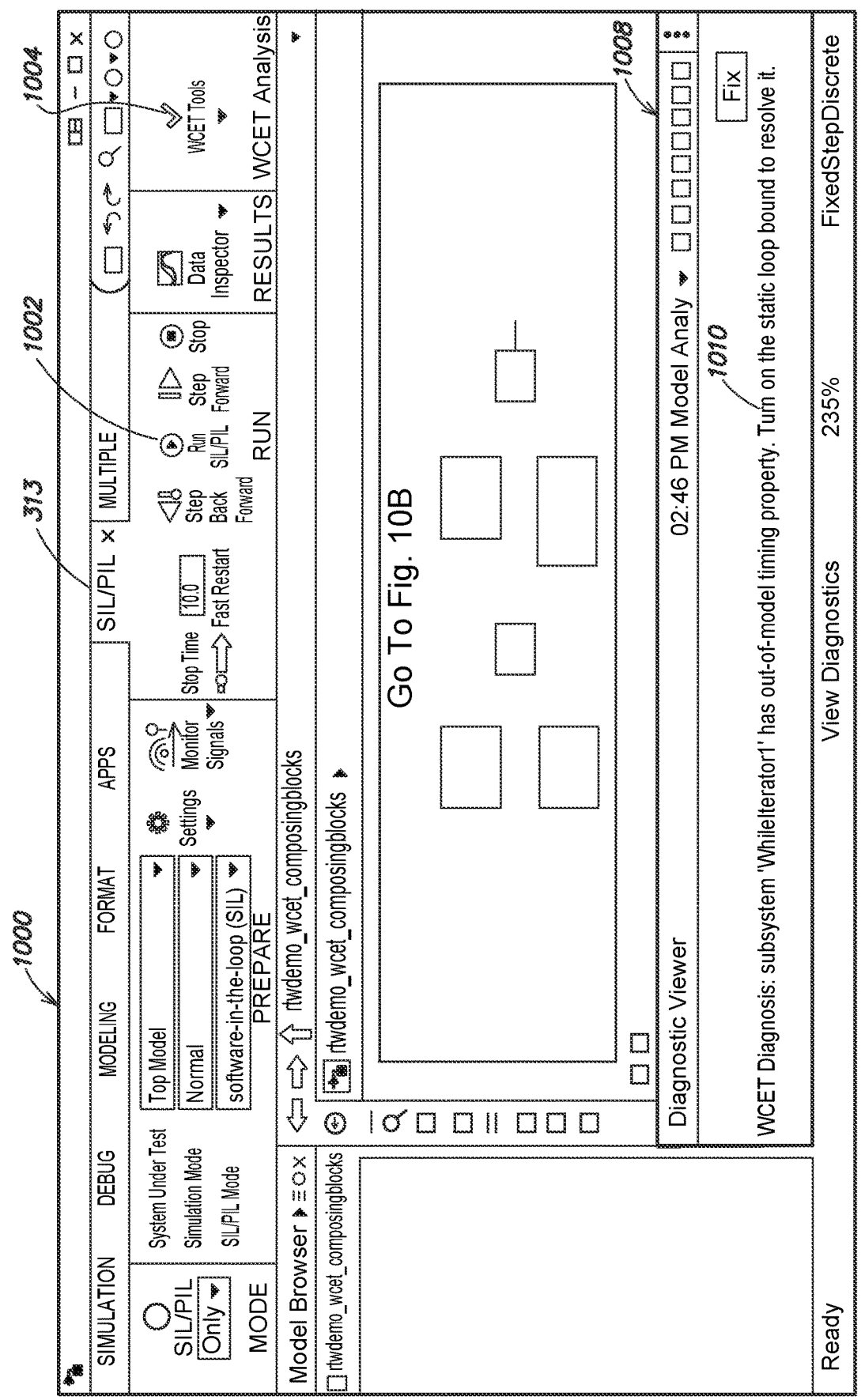
FIGS. 10A-B are partial views of an example User Interface (UI) for presenting Worst Case Execution Time (WCET) analysis results in accordance with one or more embodiments.
Figure 10B:
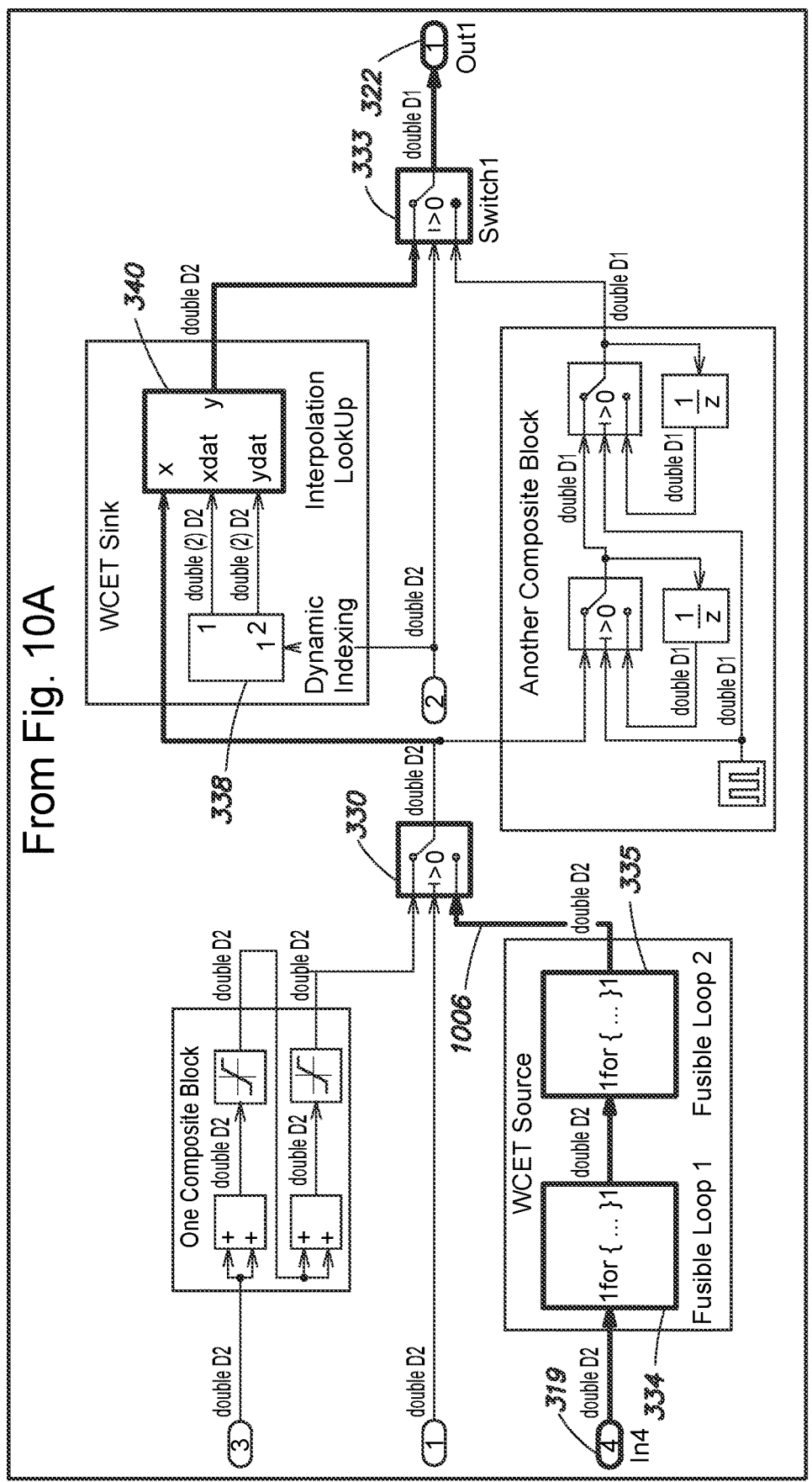

FIGS. 10A-B are partial views of an example User Interface (UI) 1000 generated by the WCET analysis system 200 in accordance with one or more embodiments. The UI 1000 may include a visual depiction of the model 300 in which one or more graphical affordances are used to identify the path through the model 300 determined by the WCET analysis system 200 to be the WCET. The model editor window may be opened to the SIL/PIL tab 313 as illustrated. The SIL/PIL tab 313 may correspond to a SIL/PIL manager app that provides tools for running and verifying generated model code. The commands available in the SIL/PIL tab 313 may include a Run SIL/PIL button 1002 for running a SIL or PIL simulation of the model 300. The SIL/PIL tab 313 also may include a WCET Tools button 1004, which may be used to open or access a WCET app. The path determined as having the WCET may follow Inport source block 319, the For Iterator subsystem blocks 334 and 335, the Switch block 330, the Interpolation Using Prelookup block 340, the Switch block 333, and the Outport sink block 322. As illustrated in FIG. 10B, the WCET analysis system 200 may highlight or bold the path identified as the WCET, as indicated at 1006, so that it may be readily identified to the user.

In some embodiments, one or more UIs, such as the UI 1000, may include one or more panes, such as pane 1008 that may present diagnostic information generated by the simulation engine 108 and/or by the execution path analysis engine 206. For example, the simulation engine 108 may detect errors generated during execution of a model and may present those errors in the pane 1008, which may be named a Diagnostic Viewer. The simulation engine 108 also may present warnings and information generated during loading a model in memory in the Diagnostic Viewer 1008. The execution path analysis engine 206 may present information on model conditions that affect the WCET analysis in the Diagnostic Viewer 1008. For example, as indicated at entry 1010, the execution path analysis engine 206 may present information regarding a loop structure, such as a while loop that has an unexpected timing property. As noted, execution time measurements, e.g., for composite code blocks, may be expected to correspond to, e.g., match within a tolerance, a probability distribution model, such as Normal (Gaussian), Gumbel, Student's t-distribution, etc. If the execution time measurement for a composite code block does not match the probability distribution model within the tolerance, the condition may be reported, e.g., in the Diagnostic Viewer 1008. The execution path analysis engine 206 also may present one or more suggestions for correcting the condition being presented. For example, as also show at entry 1010, the execution path analysis engine 206 may suggest the user activate a static loop bound tool to resolve the condition.

In some embodiments, the WCET analysis system 200 may report other conditions in the Diagnostic Viewer 1008, such as insufficient test coverage, insufficient execution time measurement counts, compromised measurement systems, and library functions not available for analysis by the WCET analysis system. Compromised measurement system indicates the execution environment does not accurately represent the intended execution environment. For example, execution time measurements serve as a reliable cost model for determining the WCET provided that the measurement system accurately reflects the intended execution environment. For example, if the measurement system hardware is also running unrelated tasks, the cost model may become inaccurate. Library functions not available indicates static analysis is unable for one or more functions.

Figure 11:
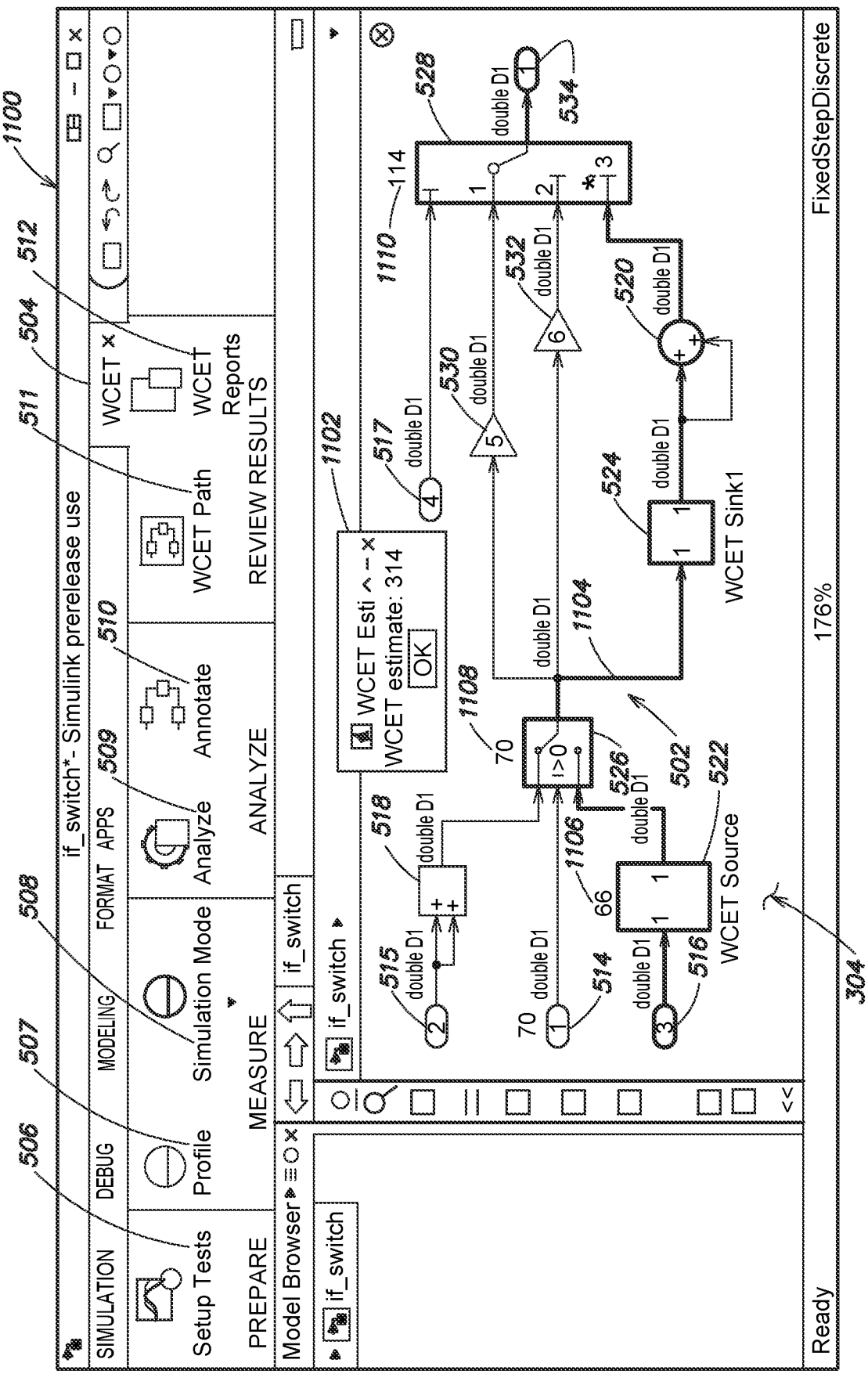
FIG. 11 is an example of another UI for presenting WCET analysis results in accordance with one or more embodiments.

FIG. 11 is an example of an alternative UI 1100 for presenting WCET analysis results for a simulation model in accordance with one or more embodiments. The UI 1100 may be in the form of a model editor having a canvas 304. The simulation model 502 for which the WCET analysis was performed may be presented on the canvas 304. The UI engine 102 may present the WCET determined for the model 502 on the UI 1100. For example, the UI engine 102 may present the WCET value, e.g., 314 milliseconds, in a popup window 1102. The UI engine 102 also may mark the WCET path through the model 502. For example, the UI engine 102 may use one or more graphical affordances, such as yellow highlighting, to mark model elements, e.g., blocks, and connections, e.g., arrows, that are along the WCET path, as indicated at 1104. In some embodiments, the UI engine 102 also may present the WCET as calculated for one or more the model elements and/or composite model elements shown in the model editor. For example, the UI engine 102 may present a graphical affordance 1106 showing the WCET value, i.e., '66', calculated for the WCET source subsystem 522, another graphical affordance 1108 showing the WCET value, i.e., '70', calculated for the Switch block 526, and a further graphical affordance 1110 showing the WCET value, i.e., '114', calculated for the Multiport Switch block 528.

Figure 12A:
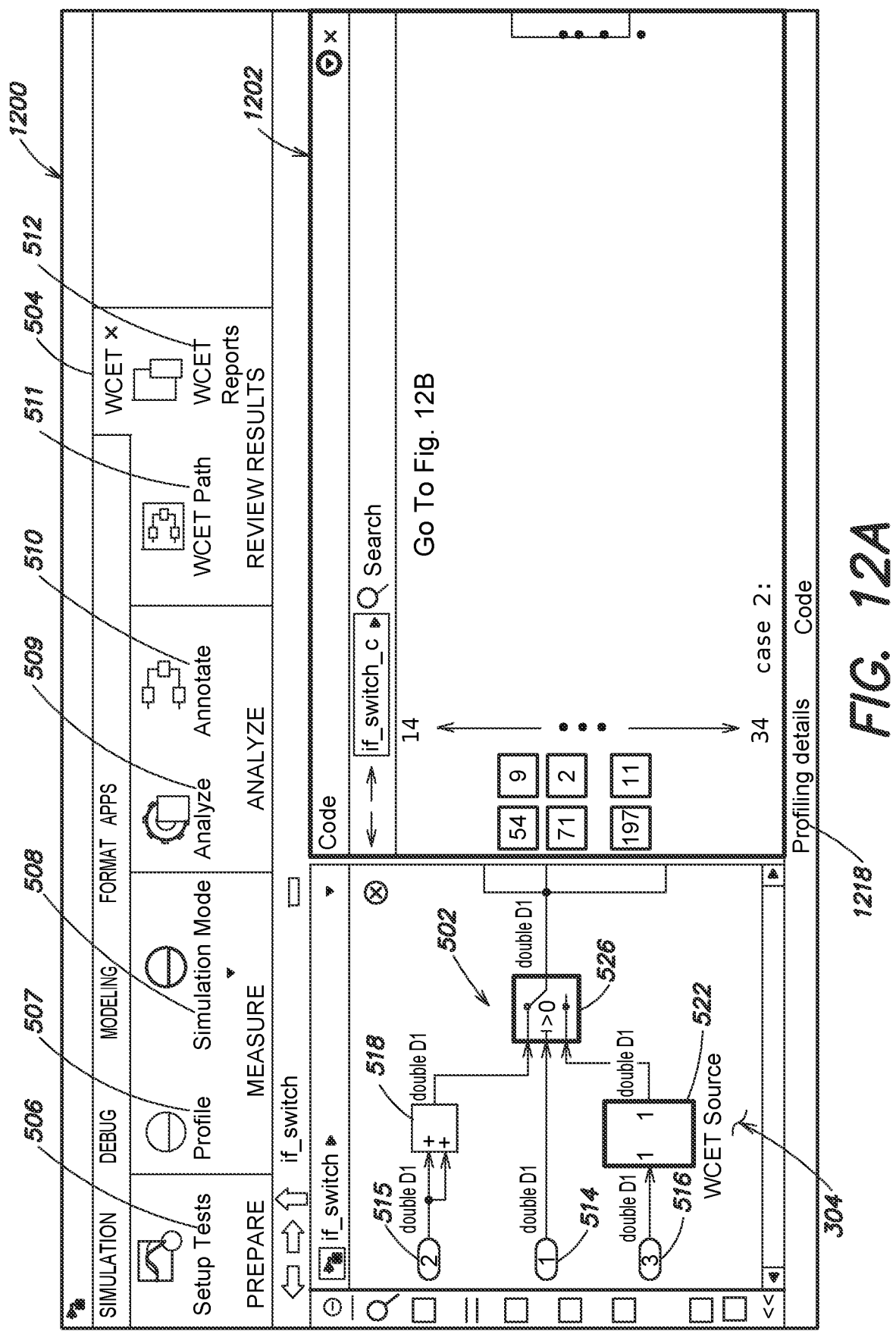

FIGS. 12A-B are partial views of an example of an alternative UI 1200 for presenting WCET analysis results in accordance with one or more embodiments. The UI 1200 may be in the form of a model editor having a canvas 304. The simulation model 502 for which the WCET analysis was performed may be presented on the canvas 304. The UI also may include a code window or pane 1202. The code window 1202 presents textual code 1203 generated by the code generator 124 for the simulation model 502. The code window 1202 may only present a portion of the generated code, which may contain many more lines of code. The code window 1202 may include a scroll bar 1204 for scrolling through all lines of the generated code. As shown, lines 14-34 of the generated code are presented in the code window 1202. In some embodiments, the UI engine 102 may include results from the WCET analysis in the code window 1202. For example, the UI engine 102 may include one or more of the worst case execution times, the number of measurements, the average execution times, or the best case execution time determined by the WCET engine 208 for different segments of the code generated for the simulation model 502, such as lines of code corresponding to a composite code block. In some embodiments, the worst case execution times and number of measurements may be presented numerically in the code window 1202 alongside one or more lines of code. For example, the UI engine 102 may include a WCET value 1206, i.e., 54 milliseconds, and a number of measurements value 1208, i.e., 9, for line 24, which assigns a value to the variable named 'rtb_Switch' based on the sum of two other variables. The UI engine 102 may further include a WCET value 1210, i.e., 71 milliseconds, and a number of measurements value 1212, i.e., 2, for line 26, which assigns a value to the 'rtb_Switch' variable based on the execution of a function named 'WCETsource'. The UI engine 102 may include a WCET value 1214, i.e., 197 milliseconds, and a number of measurements value 1216, i.e., 11, for line 29, which executes a function named 'switch'. The set of WCET values for the lines of code in the code window 1202 provide a user with a path-level execution time profile for the generated code. For example, a user may scroll through the code window 1202 and examine the WCET values presented for all of the segments of the code, e.g., to evaluate the total WCET for the code. The user may also compare WCET values for different segments of code. In some embodiments, the user may search for particular WCET values presented in the code window 1202, e.g., for the highest WCET value, for all WCET values exceeding some threshold, etc., thereby going directly to the one or more segments of interest to the user.

In some embodiments, the WCET analysis system 200 may also provide traceability between the generated code presented in the code window 1202 and one or more elements, e.g., blocks from the simulation model 304. The UI engine 102 may highlight or otherwise mark the one or more selected lines of code. In response, the WCET analysis system 200 may trace the one or more selected lines of code to the simulation model 502 as presented on the canvas 304 of the model editor 1200. For example, a user may select line 26 of the code, as illustrated in FIG. 12B. The WCET analysis system 200 may trace line 26 to the simulation model 502 and determine that line 26 corresponds to the Inport block 516, the subsystem named 'WCET source' 522, and the Switch block 526. The UI engine 102 may utilize one or more graphical affordances, such as highlighting, to mark or otherwise designate the elements of the model 502 to which line 26 of the code traces.

FIGS. 13A-B are partial views of an illustration of an example code window 1300 in accordance with one or more embodiments. The code window 1300 may present code 1302 generated for a simulation model, and the WCET analysis system 200 may annotate the generated code 1302 with WCET execution times. The code 1302 may include a first segment 1304 and a second segment 1306 that may represent True/False branches, e.g., implemented using IF/ELSE operators. The code 1302 may include a third segment 1308 and a fourth segment 1310 that also may represent True/False branches implemented using IF/ELSE operators. The code 1302 also may include a fifth segment 1312 that is a for loop. The WCET analysis system 200 may determine WCET values and numbers of measurements for segments of the code. The UI engine 102 may present the determined WCET values and numbers of measurements in the code window 1300, e.g., through one or more graphical affordances. For example, graphical affordances 1314 and 1316 may present the WCET value and number of measurements for the first code segment 1304. Graphical affordances 1318 and 1320 may present the WCET value and number of measurements for the second code segment 1306. Graphical affordances 1322 and 1324 may present the WCET value and number of measurements for the third code segment 1308. Graphical affordances 1326 and 1328 may present the WCET value and number of measurements for the fourth code segment 1310. Graphical affordances 1330 and 1332 may present the WCET value and number of measurements for the fifth code segment 1312. As illustrated, the true code segments 1304 and 1308 run approximately five times faster than the respective false segments 1306 and 1310. The true and false segments 1304, 1306 and 1308, 1310 may trace to loop elements of the simulation model, and the user may conclude that the target processor has a high loop overhead penalty. In response, the user may consider unrolling the loops in the simulation model or otherwise changing the simulation model to avoid the loop penalty.

In some embodiments, in addition to tracing one or more lines of code selected from the code window 1202 to the simulation model 502, the UI engine 102 may present additional information, e.g., WCET results, for one or more composite code blocks and/or one or more selected lines of code. For example, the code windows 1202 and 1300 may include tabs for changing the presentation of information, such as tabs labeled 'Profiling details' 1218 (FIG. 12A) and 1334 (FIG. 13B). In response to selection of a 'Profiling details' tab 1218 and/or 1334, the UI engine 102 may present one or more windows or panes with detailed information.

FIG. 14 is an illustration of an example profiling details window 1400 in accordance with one or more embodiments. The profiling details window 1400 may include a plurality of rows 1402a-m. Each row 1402 may correspond to a composite code block or a code block for which execution time or other measurements were observed. In some embodiments, the rows 1402 may be organized by functions containing the respective composite code blocks. Furthermore, expand and collapse buttons, such as [+] and [−] buttons, may be provided to allow a user to obtain more detailed information for a given function. The profiling details window 1400 also may include a plurality of columns presenting information observed for the composite code blocks. For example, the profiling details window 1400 may include a column 1404 labeled 'Maximum Execution Time', a column 1406 labeled 'Average Execution Time', a column 1408 labeled 'Maximum Self Time', a column 1410 labeled 'Average Self Time', and a column 1412 labeled 'Calls'. Maximum Execution Time refers to the observed or measured WCET for the code block. Self time may refer to the execution time of a function minus the execution time of any callee functions. For each row 1402 presented in the profiling details window 1400, the column 1404 may present the maximum execution time measured for the respective composite code block. The column 1406 may present the average execution time measured for the respective composite code block. The column 1408 may present the maximum self time determined for the respective composite code block. The column 1410 may present the average self time for the respective composite code block. The column 1412 may present the number of times the respective function was called. In some embodiments, execution time and self time may be presented in a symbolic unit of measure, e.g., "ticks", which may be associated with a unit of time, such as microseconds.

It should be understood that the UI engine 102 may present some or all of the information illustrated in the profiling details window 1400 in other ways.

Figure 15:
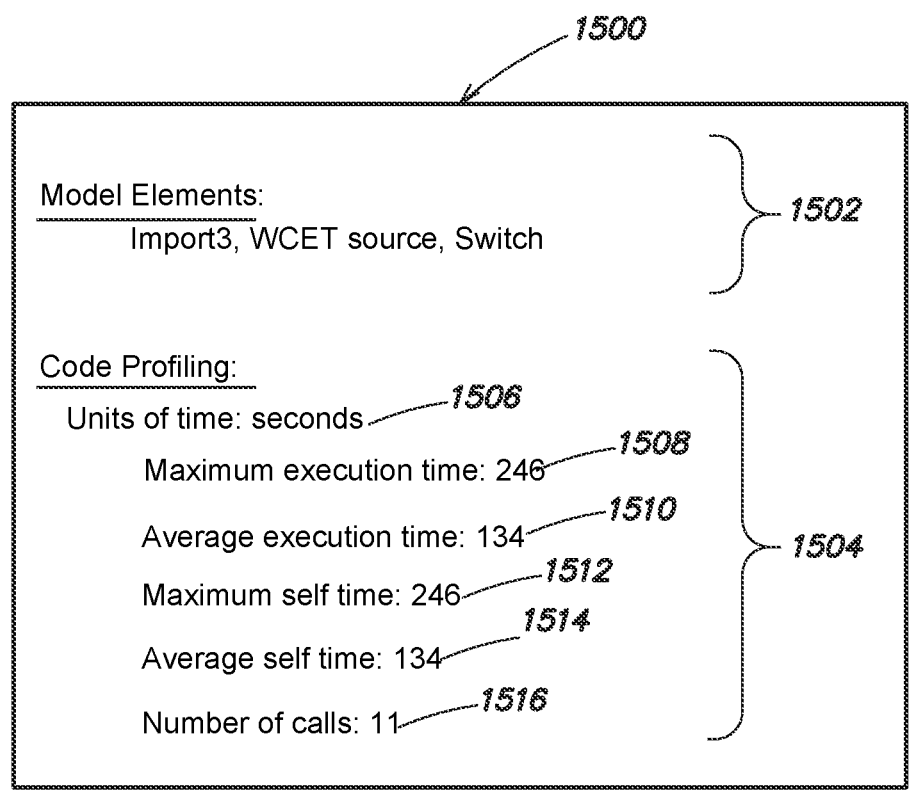
FIG. 15 is an example of another UI for presenting WCET analysis results in accordance with one or more embodiments.

FIG. 15 is an example of another UI 1500 for presenting WCET analysis results in accordance with one or more embodiments. The UI 1500 may be in the form of a popup window. In some embodiments, the UI 1500 may be presented over a model editor, such as the model editor 1200, and may present further WCET results for one more lines of code selected from the code window. For example, the popup window 1500 may include a first portion 1502, which may present a list of the names of the model elements to which the one or more selected lines of code, e.g., line 26 (FIG. 12B), are traced, e.g., Inport3, WCET source, and Switch. The UI 1500 also may include a second portion 1504 with additional WCET results for the one or more selected lines of code/model elements. In some embodiments, the second portion 1504 may include an entry 1506 indicating the units of time for execution time information, e.g., seconds. Additional WCET results presented in the second portion 1504 may include an entry 1508 for Maximum execution time for the one or more selected lines of code/model elements, an entry 1510 for Average execution time for the one or more selected lines of code/model elements, an entry 1512 for Maximum self time, an entry 1514 for Average self time, and an entry 1516 for Number of calls. To the extent the one or more selected lines of code include a function, the entry 1516 may indicate the number of times the function was called during execution of the generated code.

Figure 16:
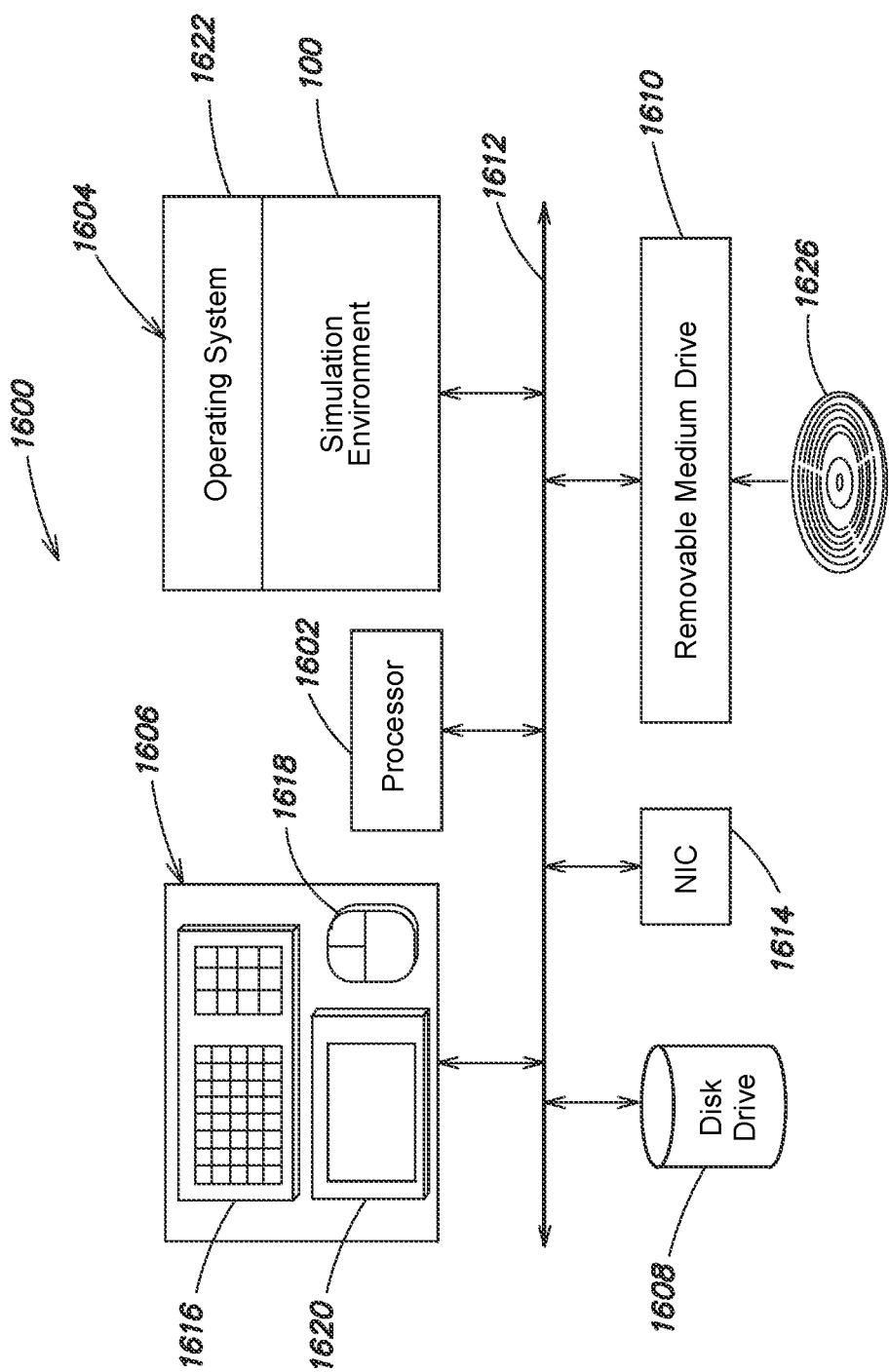
FIG. 16 is a schematic illustration of an example data processing system in accordance with one or more embodiments.

FIG. 16 is a schematic illustration of an example computer or data processing system 1600 for implementing one or more embodiments of the present disclosure in accordance with one or more embodiments. The computer system 1600 may include one or more processing elements, such as a processor 1602, a main memory 1604, user input/output (I/O) 1606, a persistent data storage unit, such as a disk drive 1608, and a removable medium drive 1610 that are interconnected by a system bus 1612. The computer system 1600 may also include a communication unit, such as a network interface card (NIC) 1614. The user I/O 1606 may include a keyboard 1616, a pointing device, such as a mouse 1618, and a display 1620. Other user I/O 1606 components include microphones, speakers, voice or speech command systems, touchpads and touchscreens, wands, styluses, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1604, which may be a Random Access Memory (RAM), may store a plurality of program libraries or modules, such as an operating system 1622, and one or more application programs that interface to the operating system 1622, such as the simulation environment 100.

The removable medium drive 1610 may accept and read a computer readable medium 1626, such as a CD, DVD, floppy disk, solid state drive, tape, flash memory or other non-transitory medium. The removable medium drive 1610 may also write to the computer readable medium 1626.

Suitable computer systems include personal computers (PCs), workstations, servers, laptops, tablets, palm computers, smart phones, electronic readers, and other portable computing devices, etc. Nonetheless, those skilled in the art will understand that the computer system 1600 of FIG. 16 is intended for illustrative purposes only, and that the present invention may be used with other computer, data processing, or computational systems or devices. The present invention may also be used in a computer network, e.g., client-server, architecture, or a public and/or private cloud computing arrangement. For example, the simulation environment 200 may be hosted on one or more cloud servers or devices, and accessed by remote clients through a web portal or an application hosting system, such as the Remote Desktop Connection tool from Microsoft Corp.

Suitable operating systems 1622 include the Windows series of operating systems from Microsoft Corp. of Redmond, WA, the Android and Chrome OS operating systems from Google Inc. of Mountain View, CA, the Linux operating system, the MAC OS® series of operating systems from Apple Inc. of Cupertino, CA, and the UNIX® series of operating systems, among others. The operating system 1622 may provide services or functions for applications or modules, such as allocating memory, organizing data objects or files according to a file system, prioritizing requests, managing I/O, etc. The operating system 1622 may run on a virtual machine, which may be provided by the data processing system 1600.

As indicated above, a user, such as an engineer, scientist, programmer, developer, etc., may utilize one or more input devices, such as the keyboard 1616, the mouse 1618, and the display 1620 to operate the simulation environment 100, and construct and revise one or more models and/or state charts. As discussed, the models may be computational and may have executable semantics. In particular, the models may be simulated or run. In particular, the models may provide one or more of time-based, event-based, state-based, message-based, frequency-based, control-flow based, and dataflow-based execution semantics. The execution of a model may simulate operation of the system that is being designed or evaluated. The term graphical model is intended to include graphical program.

Simulation models constructed within the simulation environment 100 may include textual models, graphical models, such as block diagrams, state-based models, and combinations thereof. A given model may simulate, e.g., approximate the operation of, a system.

Figure 17:
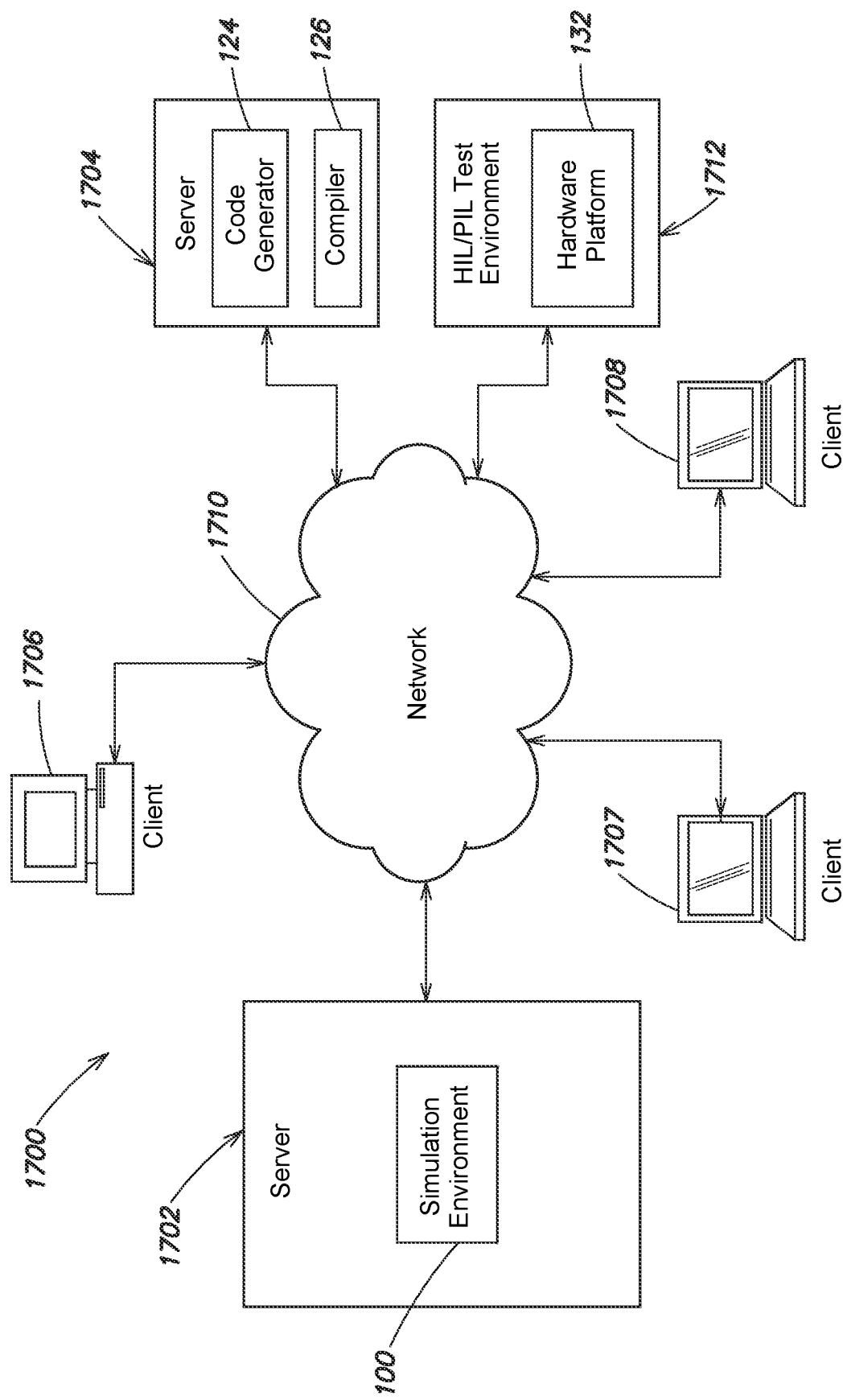
FIG. 17 is a schematic diagram of an example distributed computing environment in accordance with one or more embodiments.

FIG. 17 is a schematic diagram of an example distributed computing environment 1700 in which systems and/or methods described herein may be implemented in accordance with one or more embodiments. The environment 1700 may include client and server devices, such as two servers 1702 and 1704, and three clients 1706-1708, interconnected by one or more networks, such as network 1710. The devices of the environment 1700 may interconnect via wired connections, wireless connections, or a combination of wired and wireless connections. The servers 1702 and 1704 may include one or more devices capable of receiving, generating, storing, processing, executing, and/or providing information. For example, the servers 1702 and 1704 may include a computing device, such as a server, a desktop computer, a laptop computer, a tablet computer, a handheld computer, or a similar device.

The clients 1706-1708 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 1706-1708 may download data and/or code from the servers 1702 and 1704 via the network 1710. In some implementations, the clients 1706-1708 may be desktop computers, workstations, laptop computers, tablet computers, handheld computers, mobile phones (e.g., smart phones, radiotelephones, etc.), electronic readers, or similar devices. In some implementations, the clients 1706-1708 may receive information from and/or transmit information to the servers 1702 and 1704.

The network 1710 may include one or more wired and/or wireless networks. For example, the network 1710 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The servers 1702 and 1704 may host applications or processes accessible by the clients 1706-1708. For example, the server 1702 may host the simulation environment 100. The server 1704 may host the code generator 124 and the compiler 126. The code generator 126 may generate code for a simulation model, and the generated code may implement the functionality of the simulation model. The generated code may be deployed on a target system, which may be a real-world system. In this way, the functionality defined by the simulation model may be deployed to a real-world system.

The distributed environment 1700 also may include a Hardware-in-the-Loop (HIL) test environment 1712, which may include the hardware platform 132.

The number of devices and/or networks shown in FIG. 17 is provided as an example. In practice, there may be additional devices and/or networks, fewer devices and/or networks, different devices and/or networks, or differently arranged devices and/or networks than those shown in FIG. 17. Furthermore, two or more devices shown in FIG. 17 may be implemented within a single device, or a single device shown in FIG. 17 may be implemented as multiple, distributed devices. Additionally, one or more of the devices of the distributed computing environment 1700 may perform one or more functions described as being performed by another one or more devices of the environment 1700.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

In some embodiments, a user may interact with the simulation environment 100 and/or the state chart activity monitor 116 using spoken commands that may be input to the data processing system 1600 through a microphone or by using eye, hand, facial, or other body gestures that may be input to the data processing system 1600 through a camera. In addition, auditory outputs may be generated by the simulation environment 100 and/or the state chart activity monitor 116 additionally or alternatively to the graphically presented outputs, and the auditory outputs may be presented to the user through a speaker.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 1600. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. Therefore, it is the object of the appended claims to cover all such variations and modifications as come within the true spirit and scope of the disclosure.

What is claimed is:

1. A computer-implemented method comprising:
accessing an executable simulation model, the executable simulation model constructed according to a syntax and semantics of a modeling environment, the executable simulation model including a plurality of model blocks arranged on data paths;
generating, by one or more processors, an in-memory, intermediate representation (IR) of the executable simulation model, the in-memory IR including nodes representing basic code blocks;
subsequent to the generating, querying, by a worst case execution time (WCET) analysis engine in connection with one or more of the basic code blocks of the in-memory IR, the executable simulation environment for semantic information regarding at least one of the executable simulation model or one or more of the plurality of model blocks of the executable simulation model, wherein the semantic information being sought relates to the one or more of the basic code blocks of the in-memory IR;
obtaining, at the WCET analysis engine in response to the querying, the semantic information related to the one or more of the basic code blocks;
utilizing, by the one or more processors, the semantic information obtained by the WCET analysis engine from the simulation environment in connection with the one or more basic code blocks to modify the in-memory IR, wherein the modifying includes aggregating groups of the basic code blocks of the in-memory IR into composite code blocks based on the semantic information obtained by the WCET analysis engine from the modeling environment;
instrumenting the composite code blocks and one or more basic code blocks of the basic code blocks that were not aggregated into the composite code blocks;
collecting, by the one or more processors, execution time data for the composite code blocks and the one or more basic code blocks that were not aggregated into the composite code blocks, the execution time data including worst case execution times (WCETs) for the composite code blocks and the one or more basic code blocks that were not aggregated into the composite code blocks;
determining, by the one or more processors, from the data paths a given data path for which a sum of the WCETs collected for the composite code blocks and the one or more basic code blocks that were not aggregated into the composite code blocks that are along the given data path is a maximum; and
presenting the sum of the WCETs collected for the composite code blocks and the one or more basic code blocks that were not aggregated into the composite code blocks that are along the given data path as a WCET for the executable simulation model.

2. The computer-implemented method of claim 1 wherein the information identifies at least one of a loop bound, a switch element or a trigger condition leading to conditional execution contexts, or a bounded search of a lookup table.

3. The computer-implemented method of claim 1 wherein the semantic execution time data is collected during execution of at least a portion of the executable simulation model in a target environment.

4. The computer-implemented method of claim 3 wherein the target environment includes a processor and the method further comprises:
automatically generating code, by the one or more processors, for the at least a portion of the executable simulation model; and
executing the generated code by the processor of the target environment.

5. The computer-implemented method of claim 3 wherein the target environment includes at least one thread for running the at least a portion of the executable simulation model in Software-in-the-Loop (SIL) testing separate from the modeling environment.

6. The computer-implemented method of claim 1 wherein the presenting includes using one or more graphical affordances to identify the given data path on a visual depiction of the executable simulation model.

7. The computer-implemented method of claim 1 further comprising:
presenting one or more of the WCETs on a visual depiction of the executable simulation model.

8. The computer-implemented method of claim 1 further comprising:
automatically generating source code, by the one or more processors, for at least a portion of the executable simulation model; and
presenting at least one of the sum of the WCETs or one or more of the WCETs on a visual depiction of the automatically generated source code.

9. The computer-implemented method of claim 3 wherein the in-memory representation includes at least one of a graph or a Program Structure Tree.

10. The computer-implemented method of claim 1 further comprising:
utilizing static path analysis to identify one or more of the data paths.

11. The computer-implemented method of claim 1 further comprising:
comparing the execution time data for at least one of the composite code blocks to a probability distribution;
identifying the at least one of the composite code blocks as having poor timing predictability or input data sensitivity, if the execution time data fails to match the probability distribution within a tolerance.

12. One or more non-transitory computer-readable media containing program instructions for execution by one or more processors, the program instructions comprising instructions to:
access an executable simulation model, the executable simulation model constructed according to a syntax and semantics of a modeling environment, the executable simulation model including a plurality of model blocks arranged on data paths;
generate an in-memory, intermediate representation (IR) of the executable simulation model, the in-memory IR including nodes representing basic code blocks;
subsequent to the generating, query, by a worst case execution time (WCET) analysis engine in connection with one or more of the basic code blocks of the in-memory IR, the executable simulation environment for semantic information regarding at least one of the executable simulation model or one or more of the plurality of model blocks of the executable simulation model, wherein the semantic information being sought relates to the one or more of the basic code blocks of the in-memory IR;
obtain, at the WCET analysis engine in response to the querying, the semantic information related to the one or more of the basic code blocks;

utilize the semantic information obtained by the WCET analysis engine from the simulation environment in connection with the one or more basic code blocks to modify the in-memory IR, wherein the modifying includes aggregating groups of the basic code blocks of the in-memory IR into composite code blocks based on the semantic information obtained by the WCET analysis engine from the modeling environment;

instrument the composite code blocks and one or more basic code blocks of the basic code blocks that were not aggregated into the composite code blocks;

collect execution time data for the composite code blocks and the one or more basic code blocks that were not aggregated into the composite code blocks, the execution time data including worst case execution times (WCETs) for the composite code blocks and the one or more basic code blocks that were not aggregated into the composite code blocks;

determine from the data paths a given data path for which a sum of the WCETs collected for the composite code blocks and the one or more basic code blocks that were not aggregated into the composite code blocks that are along the given data path is a maximum; and present the sum of the WCETs collected for the composite code blocks and the one or more basic code blocks that were not aggregated into the composite code blocks that are along the given data path as a WCET for the executable simulation model.

13. The one or more computer-readable media of claim 12 wherein the semantic information identifies at least one of a loop bound, a switch element or a trigger condition leading to conditional execution contexts, or a bounded search of a lookup table.

14. An apparatus comprising:
one or more memories storing an executable simulation model, the executable simulation model constructed according to a syntax and semantics of a modeling environment, the executable simulation model including a plurality of model blocks arranged on data paths; and one or more processors coupled to the one or more memories, the one or more processors configured to:

generate an in-memory, intermediate representation (IR) of the executable simulation model, the in-memory IR including nodes representing basic code blocks;

subsequent to the generating, query, by a worst case execution time (WCET) analysis engine in connection with one or more of the basic code blocks of the in-memory IR, the executable simulation environment for semantic information regarding at least one of the executable simulation model or one or more of the plurality of model blocks of the executable simulation model, wherein the semantic information being sought relates to the one or more of the basic code blocks of the in-memory IR;

obtain, at the WCET analysis engine in response to the querying, the semantic information related to the one or more of the basic code blocks;

utilize the semantic information obtained by the WCET analysis engine from the simulation environment in connection with the one or more basic code blocks to modify the in-memory IR, wherein the modifying includes aggregating groups of the basic code blocks of the in-memory IR into composite code blocks based on the semantic information obtained by the WCET analysis engine from the modeling environment;

instrument the composite code blocks and one or more basic code blocks of the basic code blocks that were not aggregated into the composite code blocks;

collect execution time data for the composite code blocks and the one or more basic code blocks that were not aggregated into the composite code blocks, the execution time data including worst case execution times (WCETs) for the composite code blocks and the one or more basic code blocks that were not aggregated into the composite code blocks;

determine from the data paths a given data path for which a sum of the WCETs collected for the composite code blocks and the one or more basic code blocks that were not aggregated into the composite code blocks that are along the given data path is a maximum; and present the sum of the WCETs collected for the composite code blocks and the one or more basic code blocks that were not aggregated into the composite code blocks that are along the given data path as a WCET for the executable simulation model.

15. The apparatus of claim 14 wherein the semantic information identifies at least one of a loop bound, a switch element or a trigger condition leading to conditional execution contexts, or a bounded search of a lookup table.

* * * * *

UNITED STATES PATENT AND TRADEMARK OFFICE
CERTIFICATE OF CORRECTION

PATENT NO. : 12,360,748 B1  
APPLICATION NO. : 18/075855  
DATED : July 15, 2025  
INVENTOR(S) : Yuchen Zhang et al.

Page 1 of 1

It is certified that error appears in the above-identified patent and that said Letters Patent is hereby corrected as shown below:

In the Claims

Claim 2:  
Column 27, Line 58 reads:  
"the information identifies at least one of a loop bound, a"  
Should read:  
--the semantic information identifies at least one of a loop bound, a--

Claim 3:  
Column 27, Line 62 reads:  
"the semantic execution time data is collected during execu-"  
Should read:  
--the execution time data is collected during execu- --

Signed and Sealed this  
Sixteenth Day of December, 2025

John A. Squires  
*Director of the United States Patent and Trademark Office*